(12) United States Patent
Lai et al.

(10) Patent No.: US 11,730,305 B2
(45) Date of Patent: Aug. 22, 2023

(54) EXTRACTION DEVICE AND EXTRACTING METHOD

(71) Applicant: Wistron Corp., New Taipei (TW)

(72) Inventors: Pei-Ling Lai, New Taipei (TW); Chao Hsuan Chiu, New Taipei (TW); Ying Lun Hsu, New Taipei (TW); Yu-Fang Chen, New Taipei (TW); Chia Ming Liang, New Taipei (TW); Yu-Kai Su, New Taipei (TW)

(73) Assignee: WISTRON CORP., New Taipei (TW)

( * ) Notice: Subject to any disclaimer, the term of this patent is extended or adjusted under 35 U.S.C. 154(b) by 864 days.

(21) Appl. No.: 16/710,215

(22) Filed: Dec. 11, 2019

(65) Prior Publication Data
US 2020/0345169 A1     Nov. 5, 2020

(30) Foreign Application Priority Data

May 3, 2019    (TW) ................................ 108115394
Aug. 29, 2019   (TW) ................................ 108211487

(51) Int. Cl.
*A47J 31/06*      (2006.01)
*A47J 31/02*      (2006.01)
(Continued)

(52) U.S. Cl.
CPC ......... *A47J 31/0605* (2013.01); *A47J 31/002* (2013.01); *A47J 31/02* (2013.01); *A47J 31/52* (2013.01)

(58) Field of Classification Search
CPC ...... A47J 31/56; A47J 31/3671; A47J 31/469; A47J 31/30; A47J 31/41; A47J 31/467;
(Continued)

(56) References Cited

U.S. PATENT DOCUMENTS 7,685,930 B2 *   3/2010   Mandralis .......... B65D 85/8061
                                                                                                           99/302 R
10,682,005 B2    6/2020   Suzuki et al.
(Continued)

FOREIGN PATENT DOCUMENTS

CN           1655707 A      8/2005
CN       101028735 A      9/2007
(Continued)

OTHER PUBLICATIONS

Japan Patent Office, "Office Action", 2020-079671, dated Mar. 30, 2021.
(Continued)

*Primary Examiner* — Phuong T Nguyen
(74) *Attorney, Agent, or Firm* — Locke Lord LLP; Tim Tingkang Xia, Esq.

(57) ABSTRACT

The disclosure relates to an extraction device for extracting soluble favors from raw materials that are distributed within liquid. The extraction device includes a first container, a second container, a valve, and an air suction device. The second container is configured for storing the mixture of the raw materials and the liquid. The valve is connected to the second container and the first container. The air suction device is connected to the first container and configured to decrease the internal pressure of the first container to a predetermined value. When the internal pressure of the first container reaches the predetermined value, the valve is activated to connect the first container to the second container. The disclosure also relates to an extracting method for using the extraction device.

34 Claims, 26 Drawing Sheets

(51) Int. Cl.
*A47J 31/00* (2006.01)
*A47J 31/52* (2006.01)

(58) Field of Classification Search
CPC .... A47J 31/545; A47J 31/0605; A47J 31/002; A47J 31/02; A47J 31/52
USPC .......... 99/275, 280, 281, 288, 290, 295
See application file for complete search history.

(56) References Cited

U.S. PATENT DOCUMENTS

2007/0207236 A1   9/2007   Chiu
2017/0295992 A1*  10/2017  Mangold ............... A47J 31/467

FOREIGN PATENT DOCUMENTS

| CN | 201153867 Y | 11/2008 |
| CN | 103142142 A | 6/2013 |
| CN | 107019425 A | 8/2017 |
| CN | 107788844 A | 3/2018 |
| CN | 108078379 A | 5/2018 |
| JP | 2015073794  | 4/2015 |
| JP | 2016007453  | 1/2016 |
| KR | 20150143412 A | 12/2015 |
| TW | M398875 U | 3/2011 |

OTHER PUBLICATIONS

China Patent Office, "Office Action", dated Jan. 14, 2022, China.
Taiwan Patent Office, "Office Action", dated Jan. 16, 2020, Taiwan.
Korea Patent Office, Office Action of KR10-2020-0050799, dated Apr. 29, 2021, Korea.
China Patent Office, "Office Action", 201910748624.4, dated Sep. 18, 2021.

* cited by examiner

EXTRACTION DEVICE AND EXTRACTING METHOD

CROSS-REFERENCE TO RELATED APPLICATIONS

This non-provisional application claims priority under 35 U.S.C. § 119(a) on Patent Application No(s). 108115394 filed in R.O.C. Taiwan on May 3, 2019 and Patent Application No(s). 108211487 filed in R.O.C. Taiwan on Aug. 29, 2019, the entire contents of which are hereby incorporated by reference.

TECHNICAL FIELD

The disclosure relates to an extraction device and an extracting method, more particularly to an extraction device having a valve and an air suction device and an extracting method using the same.

BACKGROUND

With the improvement of living standard, coffee is not only a drink for helping people feel less tired and increase energy levels but more of a casual lifestyle that people are looking for. This makes coffee become more and more common, and various types of coffee drinks all have a large market share.

Take cold brew coffee as an example, the cold brew coffee has a distinctive flavor so it is gaining ground in recent years. The most common way of making the cold brew coffee is to soak the ground coffee in water of room temperature or lower temperature and wait for hours to extract the full flavor from the ground coffee.

However, making the brew coffee is a time-consuming and troublesome exercise. The soaking process usually takes at least 12 to 24 hours, and the mixture of the ground coffee and water has to be stored in the refrigerator during that time. In other words, the cold brew coffee needs to be pre-prepared at least half day or a day before. Therefore, the conventional method of making the brew coffee is not suitable for ready-to-drink market, not to mention the cold brew coffee occupies a large space in the refrigerator and increases electricity consumption. In addition, the coffee shops still often fail to pre-prepare a sufficient amount of cold brew coffee and miss out on potential sales, or overstock the brew coffee and result in leftover and wasted coffee. Besides, soaking the ground coffee too long is easy to extract unwanted impurities and thus affecting the flavor.

SUMMARY

One embodiment of the disclosure provides an extraction device configured for a mixture comprising a liquid and a raw material. The extraction device includes a first container, a second container, a valve, and an air suction device. The second container is configured for storing the mixture. The valve is connected to the second container and the first container. The air suction device is connected to the first container and to decrease an internal pressure of the first container to a predetermined value. When the internal pressure of the first container reaches the predetermined value, the valve is activated to connect the first container to the second container.

One embodiment of the disclosure provides an extracting method adapted to an extraction device. The extraction device includes a first container and a valve. The valve is connected to the first container. The extracting method includes: performing a pressure-decreasing process on the first container; determining whether an internal pressure of the first container is smaller than or equal to a predetermined value; when the internal pressure of the first container is determined to be smaller than or equal to the predetermined value, the valve is activated; and when the internal pressure of the first container is determined to be larger than the predetermined value of pressure, performing the pressure-decreasing process on the first container.

One embodiment of the disclosure provides an extraction device configured for a mixture comprising a liquid and a raw material and for a first container having an opening. The extraction device includes a second container, a valve, and an air suction device. The second container is configured for storing the mixture. The valve is connected to the second container and the first container. The air suction device is configured to decrease an internal pressure of the first container to a predetermined value. When the internal pressure of the first container reaches the predetermined valve, the valve is activated to connect the second container to the first container.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
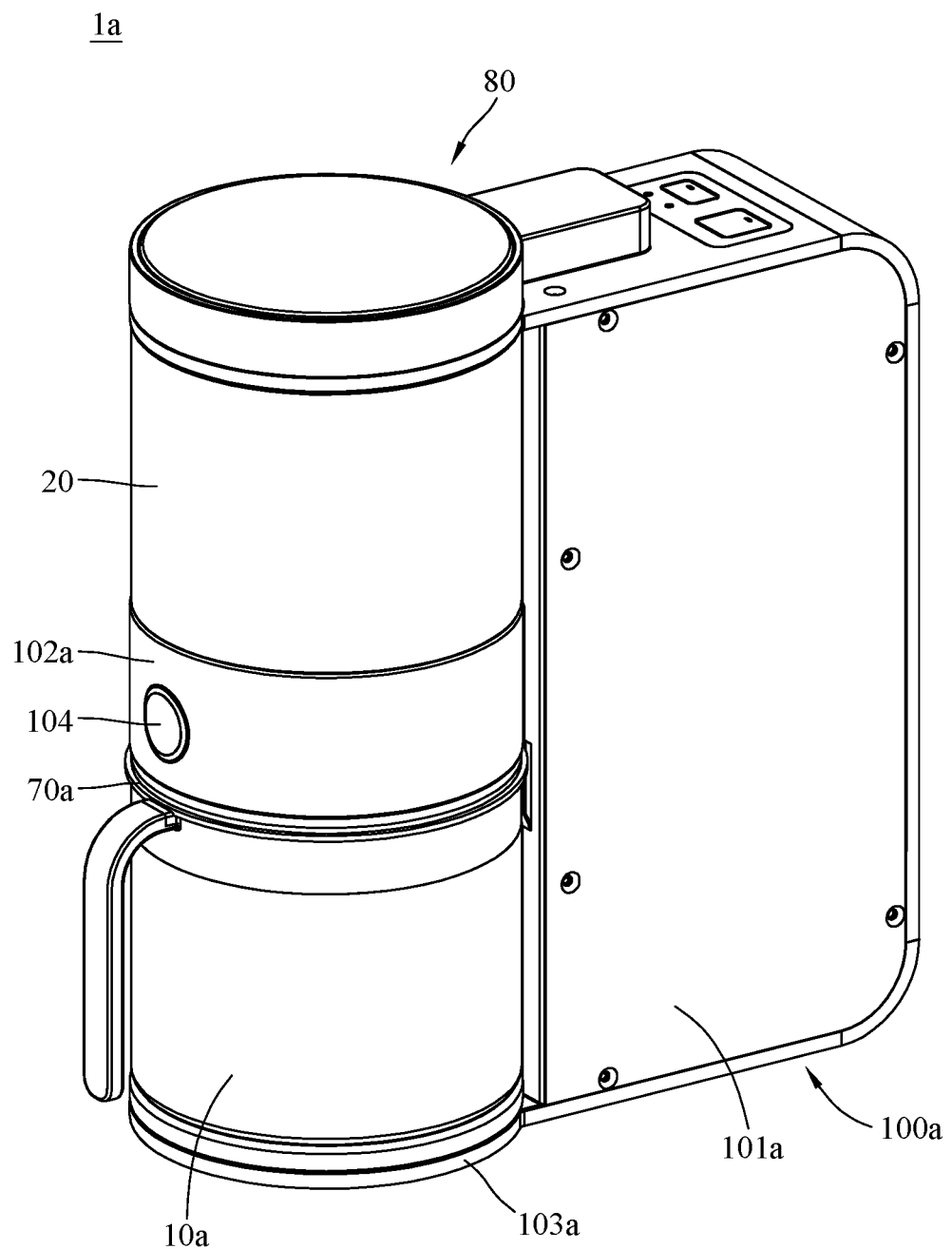
FIG. 1 is perspective view of an extraction device according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained unless the terms have a specific meaning in the present disclosure. Furthermore, in order to simplify the drawings, some conventional structures and components are drawn in a simplified manner to keep the drawings clean.

Further, the following embodiments are disclosed by the figures, and some practical details are described in the following paragraphs, but the present disclosure is not limited thereto. Furthermore, for the purpose of illustration, some of the structures and components in the figures are simplified, and wires, lines or buses are omitted in some of the figures. And the size, ratio, and angle of the components in the drawings of the present disclosure may be exaggerated for illustrative purposes, but the present disclosure is not limited thereto, and various modifications are allowed and can be made according to the following disclosure as long as it does not depart from the spirit of the present disclosure. Note that the actual size and designs of the product manufactured based on the present disclosure may also be modified according to any actual requirements.

Further, the terms, such as "end", "portion", "part", "area" and the like may be used in the following to describe specific components and structures or specific features thereon or therebetween, but are not intended to limit these components and structures. In the following, it may use terms, such as "substantially", "approximately" or "about"; when these terms are used in combination with size, concentration, temperature or other physical or chemical properties or characteristics, they are used to express that, the deviation existing in the upper and/or lower limits of the range of these properties or characteristics or the acceptable tolerances caused by the manufacturing tolerances or analysis process, would still able to achieve the desired effect.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings. The terms of the components in the disclosure are sometimes referred to in a more concise manner, depending on the requirements of the description, and should be understood by the reader.

Figure 2:
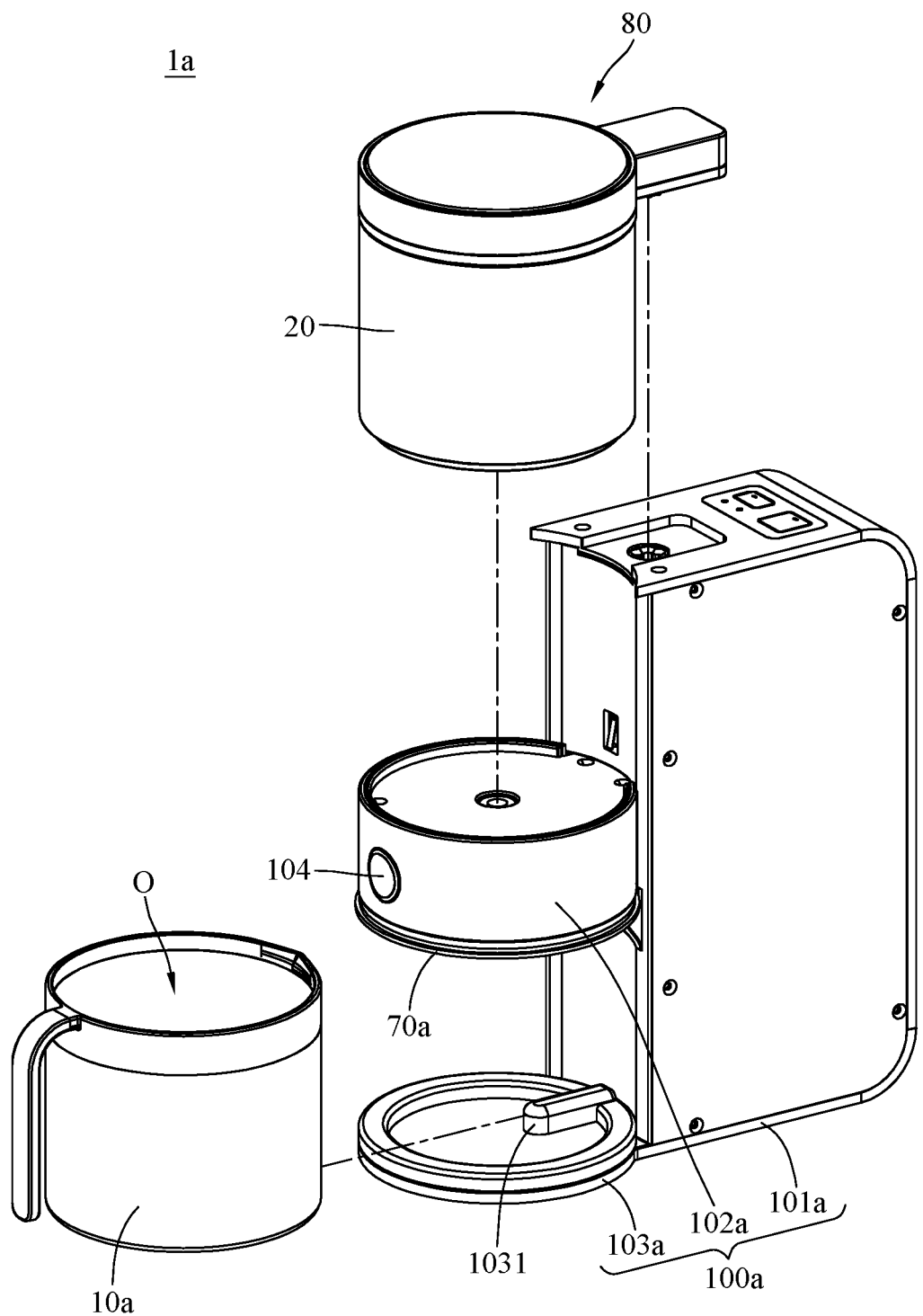
FIGS. 2-3 are exploded views of the extraction device in FIG. 1, taken from different viewpoints.
Figure 3:
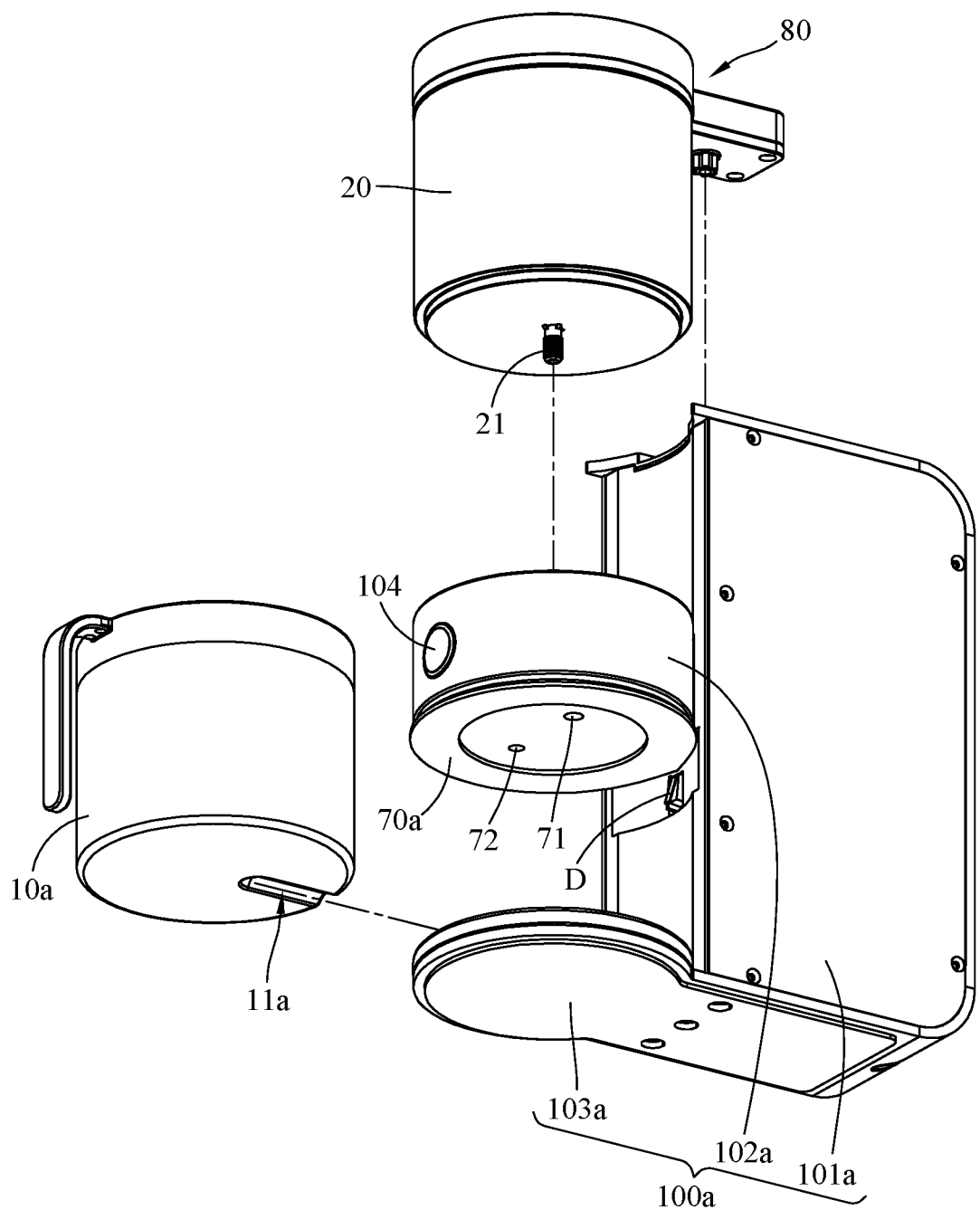
Figure 4:
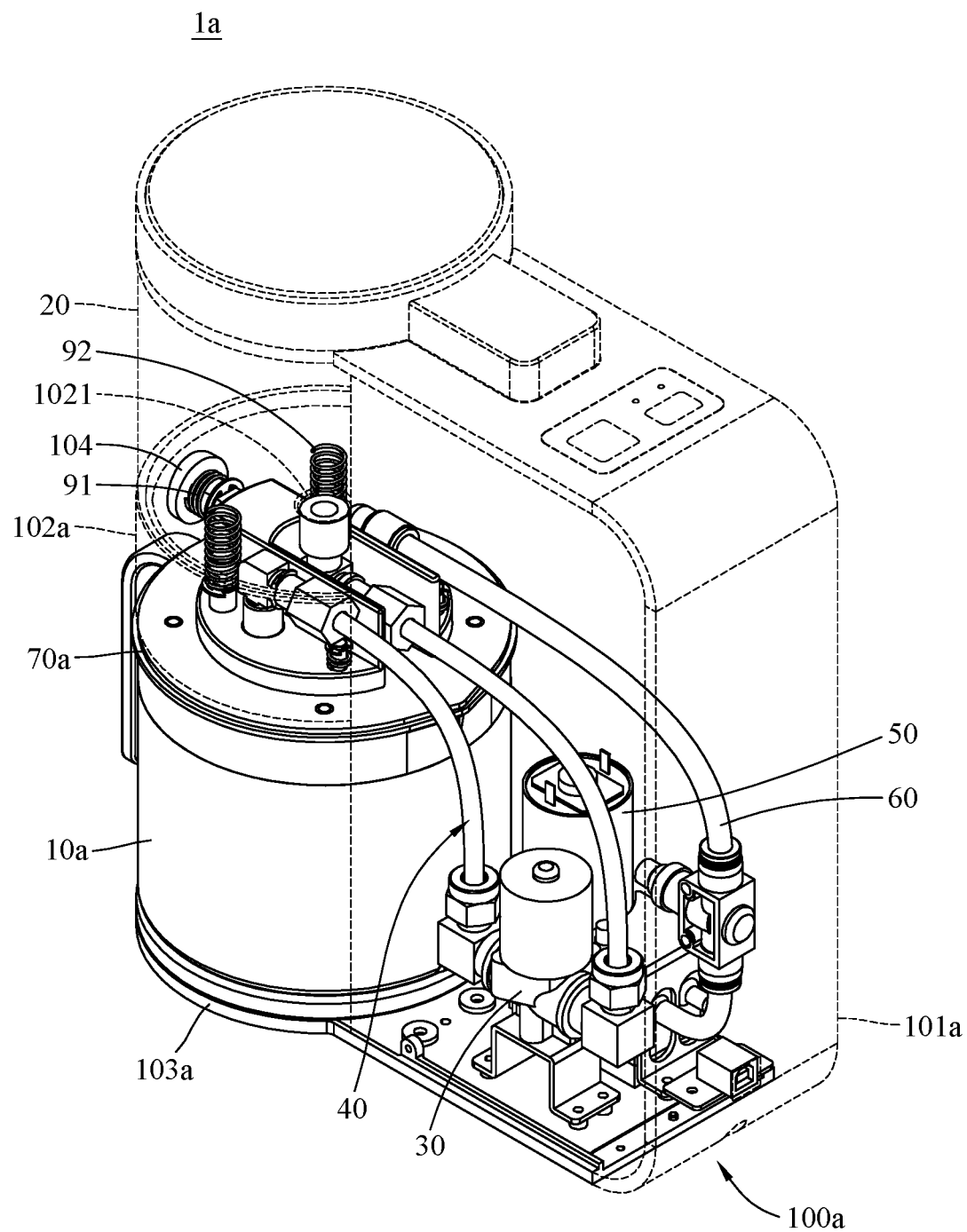
FIG. 4 is a perspective view showing the interior of the extraction device in FIG. 1.

Firstly, please refer to FIGS. 1-4, where FIG. 1 is perspective view of an extraction device according to one embodiment of the disclosure, FIGS. 2-3 are exploded views of the extraction device in FIG. 1, taken from different viewpoints, and FIG. 4 is a perspective view showing the interior of the extraction device in FIG. 1.

This embodiment provides an extraction device 1a configured for extracting a mixture that includes solid and liquid substances. In the mixture, the solid content is uniformly or nonuniformly distributed within the liquid. The solid content contains soluble substances that can be dissolved by the liquid and provide aroma and flavor. The solid content can be, but not limited to, ground coffee, coffee bean or other solid materials of ready-to-drink beverages, such as tea leaf. Therefore, the solid content is the raw material for making the ready-to-drink beverage, and the soluble substances can be considered as flavor components in the solid content. And the solid content may not be limited to be in powder form or leaf form. In some other embodiments, the solid content may be replaced with another suitable liquid substance that contains soluble substances. The liquid acts as the solvent in which the soluble substances will dissolve; in other words, the liquid acts as the solvent that can extract flavor components from the solid content. The liquid can be, but not limited to, water or other types of liquid substance. In this embodiment, the liquid and the soluble substances may be edible, but the disclosure is not limited thereto. In addition, the proportion of the solid content and the liquid is not particularly limited. In some embodiments, the liquid may be mixed with one or more types of solid content. That is, the disclosure is not limited to the type, quantity, form, and proportion of the solid content and the liquid, and the mixture of the solid content and the liquid can be, but not limited to, a solid-liquid mixture. In short, in this embodiment and some other embodiments, the extraction device 1a is configured to extract the soluble substances (not shown, i.e., the flavor components) from the raw material (i.e., the solid content) distributed within the liquid (not shown). Note that the disclosure is either not limited to the amount and composition of the flavor components, the solid content, and the liquid.

To better understand the disclosure, this embodiment takes the cold brew coffee as an example; therefore, according to the most common materials for making the cold brew coffee, in the following paragraphs, the liquid is and can be simply called "water", the solid content is and can be simply called "ground coffee", the mixture of the water and the ground coffee can be considered as "water-ground mixture", the soluble substances extracted from the ground coffee can be simply called "extracted substances", "soluble components", "flavor components", or "soluble flavors", and the solution of the water and the extracted substances is the final product—"brew coffee".

Additionally, the process of soaking the ground coffee in the water is called "wetting", and that is a physical process for the ground coffee to absorb water. During this process, the soluble substances, including soluble solid and gas components, in the ground coffee will be dissolved in the water, and the ground coffee will noticeably expand in appearance. Further, with respect to coffee, the "extraction" is a process of dissolving or extracting the soluble substances from the ground coffee that has been through the wetting process; during this process, the soluble substances can be extracted from the ground coffee by undergoing different chemical or physical reactions, and such reactions may not occur in a particular order and may not occur only one time, instead, these processes may occur repeatedly to improve the extraction rate. The extraction rate directly affects the flavor; that is, low extraction rate and high extraction rate will produce different flavor profiles. For example, to some types of coffee beans, low extraction rate may produce sour flavor, but high extraction rate may produce bitter and dry flavor. Note that the disclosure is not limited to the extraction rate.

Further, the disclosure is either not limited to the size, density, shape, and distribution of the ground coffee and the way of pouring the water. Note that, before or after the wetting process, any kinetic energy added to the water-ground mixture has an important impact on the extraction rate and wetting process, but the disclosure is not limited thereto. And how to add kinetic energy to the water-ground mixture will be described in later paragraphs.

Furthermore, the type, size, amount, and shape of the soluble substances are based on the type of ground coffee, and the disclosure is not limited thereto. Also, in the disclosure, the type or amount of the ground coffee and the water, the proportion of the ground coffee and the water, the extraction rate, and the concentration of the soluble substances in the brew coffee are all not particularly limited. And for the purpose of simple illustration, the drawings of the disclosure do not show the ground coffee, the water, their mixture, the soluble substances, and the solution of the soluble substances and the water.

In this embodiment, the extraction device 1a may include a first container 10a, a second container 20, a valve 30, a fluid channel 40, an air suction device 50, and an air suction channel 60. The first container 10a is configured to collect and store, for example, a mixture of the water and the soluble substances, that is, the final beverage (e.g., the brew coffee). Therefore, the first container 10a in this embodiment may be in a form of "coffee pod", but the disclosure is not limited thereto. The second container 20 is configured to store, for example, the mixture of the liquid (e.g., water) and the solid content (e.g., the ground coffee), where the solid content, such as ground coffee, is the raw material for making the final product, such as the cold brew coffee. This embodiment takes the cold brew coffee as an example of the final product, so, in this embodiment, the second container 20 will be storing a mixture of the water and the ground coffee, and the first container 10a will be storing a mixture of the water and the flavor components extracted from the ground coffee.

The fluid channel 40 is connected to both the second container 20 and the first container 10a in order to transport the mixture of the water and the extracted soluble substances from the second container 20 to the first container 10a. The fluid channel 40 may be consisted of one or more pipes (not numbered), but the disclosure is not limited thereto. In this embodiment or some other embodiments, any type, amount, or joint configuration of the pipe or tube that can transport fluid between the second container 20 and the first container 10a can be considered an option of the fluid channel of the disclosure. In this embodiment or some other embodiments, there may be leak-proof connectors (not numbered) disposed on two opposite ends of the fluid channel 40.

The valve 30 is disposed on the fluid channel 40. When the valve 30 is closed, no fluid can flow through the fluid channel 40, such that the water and the ground coffee in the second container 20 are prevented from flowing to the first container 10a. When the valve 30 is opened, the water and the ground coffee in the second container 20 is allowed to flow through the fluid channel 40 and then flow into the first container 10a. Note that the type of valve 30 is not limited and any suitable type of valve can be used. In addition, in this embodiment or some other embodiments, the valve 30 may have an inbuilt motor or an additional motor (not shown) added thereon to control the openness and closeness of the valve 30, but the disclosure is not limited thereto. In addition, the fluid channel 40 may be optional; in some other embodiments, the extraction device may not have the fluid channel 40, in such a case, the valve can be directly connected to both the second container and the first container, but the disclosure is not limited to such modification.

The air suction channel 60 is an air channel connected to both the air suction device 50 and the first container 10a. The air suction channel 60 can be, but not limited to, consisted of one or more air pipes (not numbered), but the disclosure is not limited thereto. In this embodiment or some other embodiments, any type, amount, or joint configuration of the air pipe or tube that can transfer air between the first container 10a and the air suction device 50 can be considered an option of the air suction channel of the disclosure. In this embodiment or some other embodiments, there may be leak-proof connectors (not numbered) disposed on two opposite ends of the air suction channel 60. The air suction device 50 is able to draw air from the first container 10a by sucking air from the air suction channel 60, such that the internal pressure of the first container 10a can be decreased by the air suction device 50. However, the disclosure is not limited to the type and suction capability of the air suction device 50. In addition, the air suction channel 60 may be optional; in some other embodiments, the extraction device may not have the air suction channel 60, in such a case, the air suction device can be directly connected to the first container, but the disclosure is not limited to such modification.

In this embodiment and some other embodiments, the air suction device 50 is able to draw air from the first container 10a so as to decrease the internal pressure of the first container 10a to a predetermined value. The process that decreases the internal pressure of the first container 10a by drawing the internal air from the first container 10a can be simply called "pressure-decreasing process". The predetermined value can be any suitable value smaller than the internal pressure of the second container 20. Note that the disclosure is not limited to the rate of the pressure-decreasing process and the time it costs, and the disclosure is not limited to the internal pressure of the first container 10a and the second container 20, the predetermined value, and the difference between the predetermined value and the internal pressure of the second container 20. In addition, the disclosure is either not limited to how to detect, measure or calculate the internal pressure of the first container 10a and the second container 20, the predetermined value, and the difference between the predetermined value and the internal pressure of the second container 20. In this embodiment or some other embodiments, there may be a pressure detector (not shown) disposed on or connected to the air suction device 50 and capable of measuring pressure.

When the internal pressure of the first container 10a reaches the predetermined value, meaning that the internal pressure of the first container 10a is decreased to a value smaller than or equal to the predetermined value, the difference between the internal pressure of the first container 10a and the second container 20 is considered to be satisfying the requirement of the current extraction process. At this moment, the valve 30 will be opened and allow the water in the second container 20 to flow to the first container 10a via the fluid channel 40 and thus causing the soluble substances in the ground coffee to be dissolved and flowing to the first container 10a with the water, and the mixture of the water and the soluble substances that are collected in the first container 10a is the final product—the brew coffee. The soluble substances are the extractable substances in the ground coffee that can be dissolved by water and provide aroma and flavor.

In detail, as the internal pressure of the first container 10a is decreased to be smaller than or equal to the predetermined value, there will be a certain amount of pressure difference between the first container 10a and the second container 20, and such pressure difference helps to extract the soluble substances from the ground coffee in a short period of time. The extracted soluble substances can be dissolved in the water and flow into the first container 10a via the fluid channel 40. Using the pressure difference to extract the soluble substances can be referred as a pressure-decreasing extraction process. It is noted that the predetermined value and the pressure difference between the first container 10a and the second container 20 suitable for the pressure-decreasing extraction process are not particularly limited and can be altered according to the actual requirements, and the time for performing the pressure-decreasing extraction process is either not particularly limited.

According to an experiment result, under the condition that the room temperature is approximately 20 degrees Celsius and the predetermined value is approximately −150 torrs, the extraction device 1a only needs approximately 30 seconds to complete the pressure-decreasing extraction process on a mixture of 20 grams of ground coffee and 200 ml of water.

In contrast to the prior art that needs to take around 12-24 hours to extract the soluble flavors, the extraction time required by the extraction device 1a of the disclosure is dramatically reduced. Therefore, the extraction device 1a can instantly offer the cold brew coffee and has no need to pre-prepare a large amount of it, which helps to save the space in the refrigerator and to reduce the electricity consumption. In addition, the ground coffee is only soaked in the water in a relatively short period of time so that it is possible to greatly reduce the impurities, that affect the flavor, from being dissolved in the water. Further, due to short extraction time, the ground coffee and the water required by the extraction device 1a of this embodiment may have a ratio of approximately 1:10 to 1:12, but the prior art, that takes hours to soak the ground coffee in the water, requires a ratio of approximately 1:4 to 1:12 to achieve the same extraction rate. Therefore, the extraction device 1a requires a less amount of ground coffee, and the extraction device 1a may produce a lower caffeine brew coffee.

Further, the design that facilitates the airtightness of the first container 10a and the pressure-decreasing extraction process will be described in the following paragraphs.

As shown in FIGS. 1-4, in this embodiment, the extraction device 1a may further include a sealing component 70a, a stirring assembly 80, and a casing 100a. The casing 100a may include a main casing part 101a, a connecting casing part 102a, and a tray part 103a.

The valve 30, the air suction device 50, part of the fluid channel 40, and part of the air suction channel 60 may be accommodated in the main casing part 101a. In addition, in this embodiment or some other embodiments, there may be a control center (not shown) in the main casing part 101a, and the control center may include one or more circuit boards, processors, wires and other suitable electrical and electronic components for controlling the valve 30, the air suction device 50, and/or other electrical and electronic devices on the extraction device 1a or generating signal to the user. In addition, there may be a power button (not numbered) disposed on the main casing part 101a, and pressing the power button will turn on the extraction device 1a. And there may be an extraction start button (not numbered) disposed on the main casing part 101a as well, and pressing the extraction start button will start to perform the extraction process. Note that the disclosure is not limited to the material, configuration and shape of the main casing part 101a, and any suitable design that can accommodate the aforementioned components and fix them in position can be an option of the casing of the disclosure.

The connecting casing part 102a can be, but not limited to, detachably connected to a side of the main casing part 101a. Another part of the fluid channel 40 and another part of the air suction channel 60 are disposed through the main casing part 101a and located within the connecting casing part 102a. The second container 20 is detachably disposed on the connecting casing part 102a, and a side of the connecting casing part 102a facing the second container 20 has a hole 1021, and the end of the fluid channel 40 is connected to a discharge connector 21 of the second container 20 at the hole 1021. As shown in FIGS. 3-4, when the second container 20 is disposed on the connecting casing part 102a, the discharge connector 21 is connected to the end of the fluid channel 40 and located in the hole 1021, such that the fluid in the second container 20 is allowed to flow into the fluid channel 40.

The tray part 103a can be, but not limited to, detachably connected to the main casing part 101a. The tray part 103a and the connecting casing part 102a are located at the same side of the main casing part 101a, and the tray part 103a is located under and spaced apart from the connecting casing part 102a. In other words, the connecting casing part 102a is located above and spaced apart from the tray part 103a. The first container 10a can be disposed on the tray part 103a and located between the connecting casing part 102a and the tray part 103a. The distance between the connecting casing part 102a and the tray part 103a can be modified according to the height of the first container 10a, but the disclosure is not limited thereto.

Further, the surface of the tray part 103a facing the connecting casing part 102a has a first guide structure 1031, and the bottom surface of the first container 10a has a second guide structure 11a. In this embodiment or some other embodiments, the first guide structure 1031 may be a protrusion, the second guide structure 11a may be a groove, and the extension directions of the protrusion and the groove are substantially parallel to the installation direction of the first container 10a (as the dashed auxiliary line next to the first container shown in FIG. 2). However, the disclosure is not limited to the first guide structure 1031, the second guide structure 11a, and their shape or configuration.

When the first container 10a is placed on the tray part 103a, the second guide structure 11a is removably and slidably disposed on the first guide structure 1031 so as to guide the first container 10a to a ready position. The ready position, as shown in FIG. 1, is where the first container 10a is ready for the extraction process to begin.

In this embodiment, the sealing component 70a is movably disposed on the casing 100a. Specifically, the sealing component 70a is movably disposed on a side of the connecting casing part 102a of the casing 100a facing the tray part 103a. The sealing component 70a is able to cover and seal the opening O of the first container 10a when the first container 10a is in the ready position. In this embodiment, the sealing component 70a has a fluid discharge hole 71 and a suction hole 72 that are respectively connected to the fluid channel 40 and the air suction channel 60. Therefore, the fluid in the fluid channel 40 can be discharged from the fluid discharge hole 71 of the sealing component 70*a*, and the air can be sucked into the air suction channel 60 via the suction hole 72.

Therefore, with respect to the fluid channel 40, the fluid in the second container 20 can flow into the fluid channel 40 from the discharge connector 21 which is located at the hole 1021 of the connecting casing part 102*a*, when the valve 30 is opened, the fluid can flow through the fluid channel 40 and the valve 30 and then be discharged into the first container 10*a* from the fluid discharge hole 71 of the sealing component 70*a*. With respect to the air suction channel 60, the air suction device 50 is able to suck air from one end of the air suction channel 60 so as to suck air from the first container 10*a* via another end of the air suction channel 60 which is connected to the suction hole 72 of the sealing component 70*a* and located at the opening O of the first container 10*a*.

Figure 5:
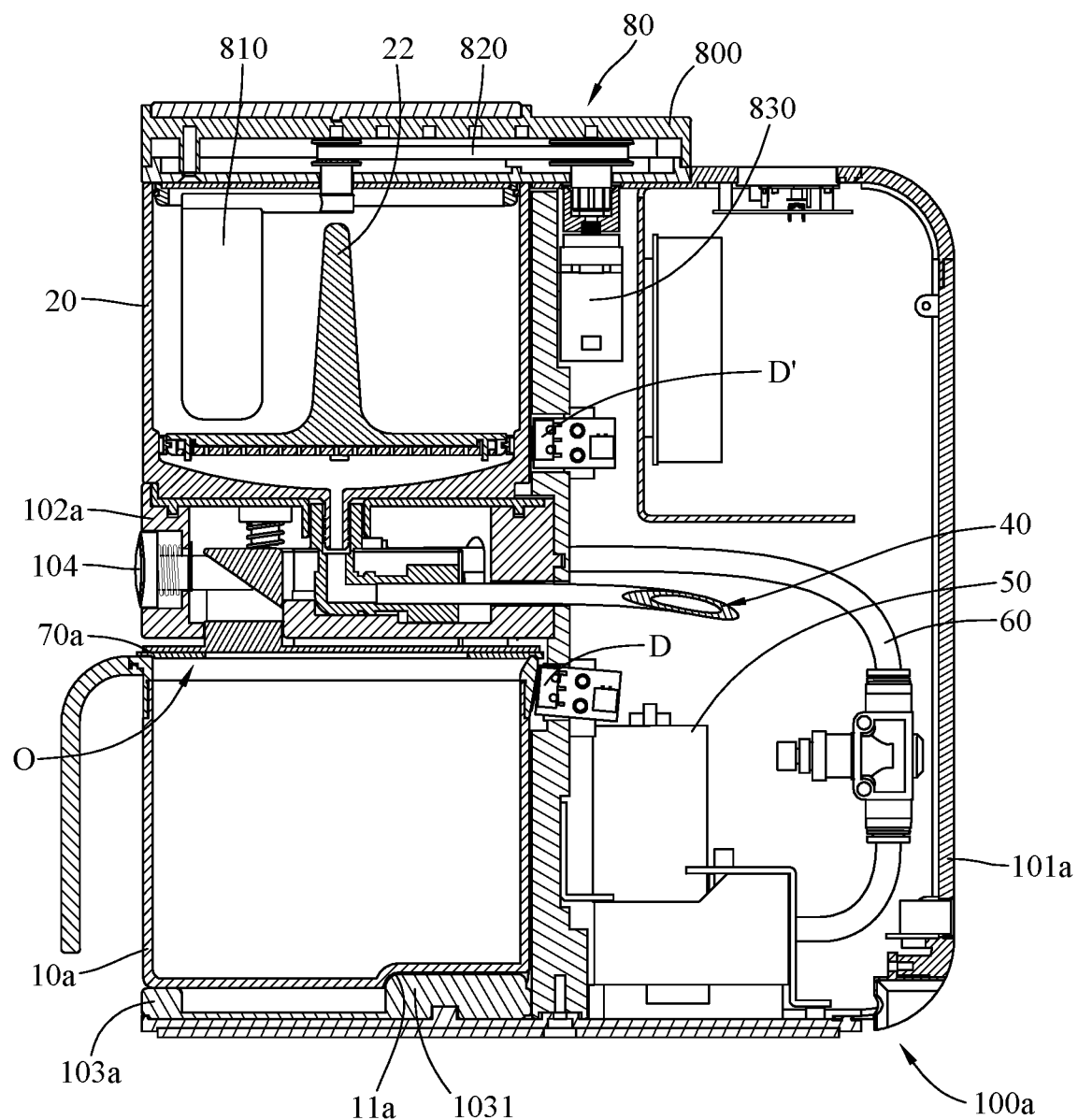
FIG. 5 is a cross-sectional side view of the extraction device in FIG. 1.

The stirring assembly 80 is detachably disposed on the second container 20, and the second container 20 is also assembled on the casing 100*a* via a stirring assembly casing 800 of the stirring assembly 80. As shown in the figures, the stirring assembly 80 may be assembled on the top side of the main casing part 101*a* of the casing 100*a*. Please refer to FIG. 5. FIG. 5 is a cross-sectional side view of the extraction device 1*a*. In this embodiment or some other embodiments, the stirring assembly 80 may include a stirring piece 810, a transmission component 820, and a motor 830. The motor 830 may be disposed in the main casing part 101*a* and is electrically connected to and controlled by the control center. The stirring piece 810 is detachably disposed on the stirring assembly 80. When the stirring assembly 80 is installed in position on the second container 20, the stirring piece 810 is movably located in the second container 20. The stirring piece 810 may be in a plate shape that extends from the opening of the second container 20 toward the bottom portion of the second container 20. One end of the transmission component 820 is connected to the stirring piece 810, and another end of the transmission component 820 is connected to the motor 830, such that the transmission component 820 is able to transmit the force generated by the motor 830 to the stirring piece 810 so as to move the stirring piece 810 within the second container 20 at a fixed or variable speed. Specifically, the stirring piece 810 can be moved about the central line (not shown) of the second container 20. The movement of the stirring piece 810 is to stir or agitate the solid-liquid mixture in the second container 20. However, the disclosure is not limited to the shape, quantity, and speed of the stirring piece 810.

In addition, as shown in the figures, there may be a filter 22 in the second container 20. The filter 22 is configured to prevent the insoluble part of the solid content (e.g., the insoluble part of the ground coffee) from entering the fluid channel 40 and the first container 10*a*. The filter 22 may have a T shape in the cross-sectional view; in detail, the filter 22 may include a flat part and a handheld structure protruding from the center of the flat part, the user can carry the filter 22 by holding the handheld structure. The peripheral of the flat part of the filter 22 that contacts the second container 20 may be made of soft material, such as silicon or rubber, and its compressibility and deformability characteristics ensure the tight contact between the filter 22 and the inner surface of the second container 20 and prevent the insoluble part of the solid content from entering the fluid channel 40. As shown in the figure, the stirring piece 810 can be considered as rotating about the handheld structure of the filter 22. However, the disclosure is not limited to the configuration of the filter 22, and the handheld structure of the filter 22 may not be limited to be at the center of the filter 22.

Further, the disclosure is either not limited to the design of the stirring assembly 80. For example, in some other embodiments, the stirring assembly may be manual and not have the motor; in such a case, the transmission component may have a handheld part for the user to operate the stirring assembly.

In addition, in this embodiment or some other embodiments, the extraction device 1*a* may further include a position detector D and a position detector D'. The position detectors D and D' can be, but not limited to, push switches. The position detector D is disposed on and may protrude from a sidewall of the main casing part 101*a* of the casing 100*a* and located between the connecting casing part 102*a* and the tray part 103*a*. When the first container 10*a* is in the ready position, the first container 10*a* presses the position detector D so that the position detector D transmits a signal to the control center to let the control center to determine that the first container 10*a* is already in the desired position. The position detector D' is also disposed on the main casing part 101*a* of the casing 100*a*. Specifically, the position detectors D and D' are disposed on the same side of the main casing part 101*a*, and the position detector D' is located above the connecting casing part 102*a*. When the second container 20 is assembled to the connecting casing part 102*a*, the second container 20 can press the position detector D' so that the position detector D' transmits a signal to the control center to let the control center to determine that the second container 20 is already in the desired position. In some embodiments, when the control center does not yet receive the signal from the position detector D and/or the position detector D', it can activate the warning light on the casing 100*a* to notice the user.

However, the disclosure is not limited to the design and location of the position detectors D and D'. In some other embodiments, the position detector may be a non-touch type detector, such as a detector using laser or infrared (IR) light for detection; in such a case, when the first container 10*a* and the second container 20 are in position, they can activate the respective position detectors in a non-direct contact manner.

Figure 6A:
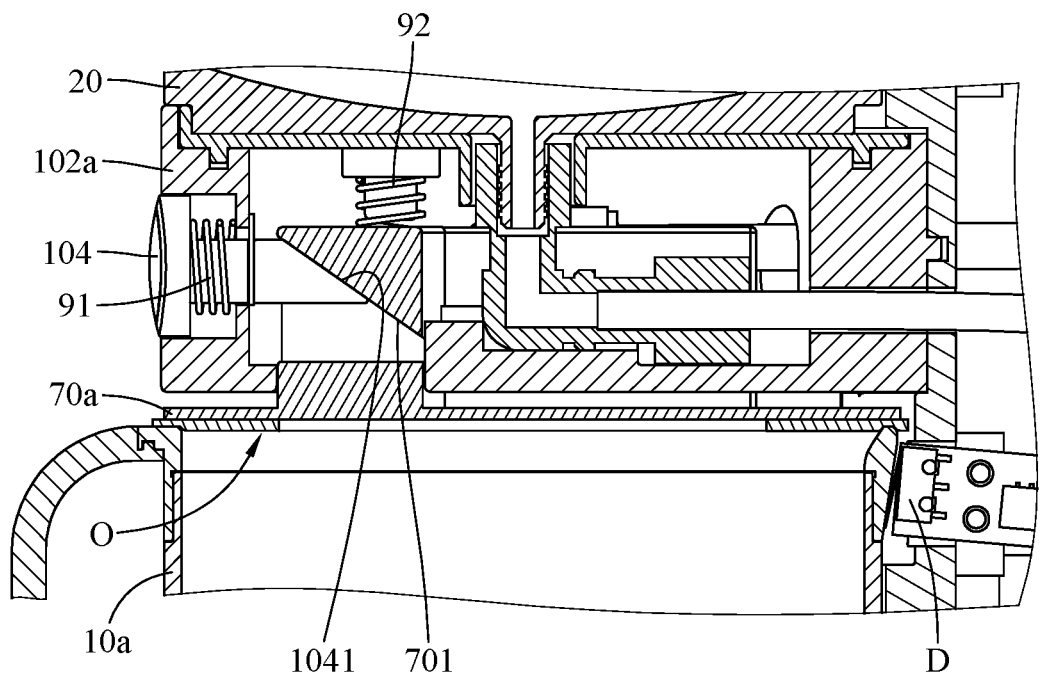
FIGS. 6A-6B are enlarged cross-sectional side views of the extraction device in FIG. 1 when a sealing component is switching positions.
Figure 6B:
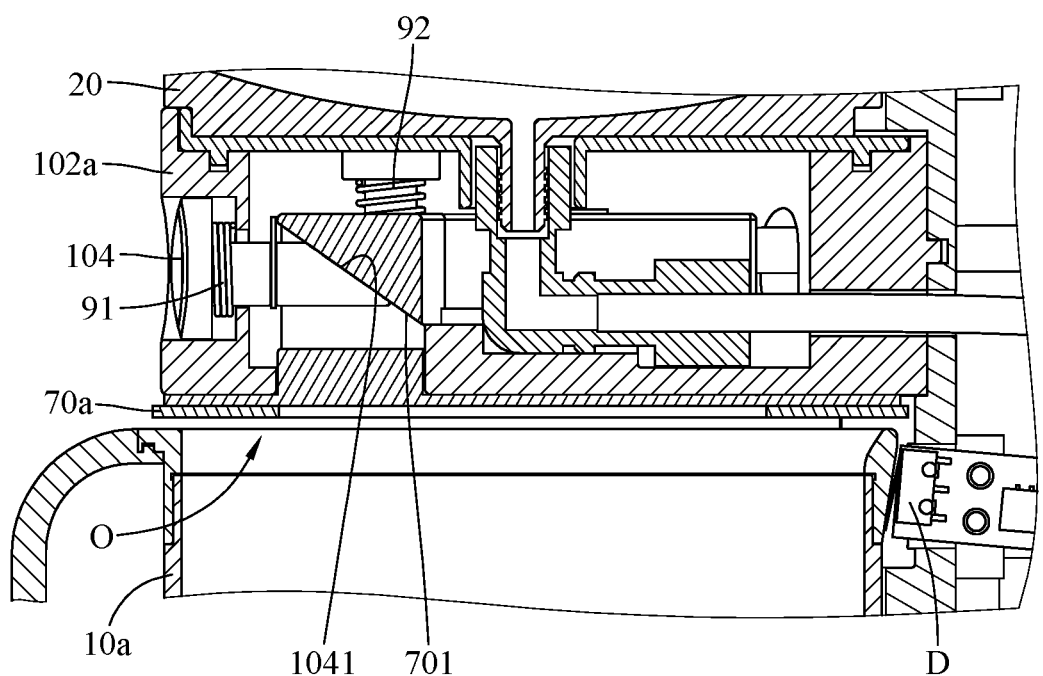

Then, please refer to FIG. 5 and further refer to FIGS. 6A-6B, where FIGS. 6A-6B are enlarged cross-sectional side views of the extraction device 1*a* when the sealing component 70*a* is switching positions. In this embodiment, the casing 100*a* may further include a push button 104 disposed on the connecting casing part 102*a* and exposed from the surface of the connecting casing part 102*a*. The extraction device 1*a* may further include a biasing member 91 and a biasing member 92. The biasing member 91 is disposed in the connecting casing part 102*a*; specifically, the biasing member 91 is, for example, a compression spring located between and pressed by the push button 104 and the connecting casing part 102*a*, and the biasing member 91 is able to force the push button 104 to move away from the connecting casing part 102*a*. The biasing member 92 is disposed in the connecting casing part 102*a*; specifically, the biasing member 92 is, for example, a compression spring located between and pressed by the sealing component 70*a* and the connecting casing part 102*a*, and the biasing member 92 is able to force the sealing component 70*a* to move away from the connecting casing part 102*a*, such as to force the sealing component 70*a* to move toward the tray part 103*a*.

In detail, the push button 104 has a first inclined surface 1041, and the sealing component 70*a* has a second inclined surface 701 configured to be in contact with the first inclined surface 1041. When the push button 104 is pushed and moved toward the internal of the connecting casing part 102a, the push button 104 can push the biasing member 91 and its first inclined surface 1041 can push the second inclined surface 701 of the sealing component 70a. During the movement of the push button 104, since the first inclined surface 1041 and the second inclined surface 701 are in contact with each other with inclined surfaces, the pushing force applied on the push button 104 will have an upward component that can lift the sealing component 70a, such that the sealing component 70a is moved from a lower position to an upper position so as to push the biasing member 92 and expose the opening O of the first container 10a. When the pushing force applied on the push button 104 is canceled, the stored elastic potential energy of the biasing member 91 will be released to move the push button 104 to its original position, and the stored elastic potential energy of the biasing member 92 will be released to move the sealing component 70a to the lower position so that the sealing component 70a will cover the opening O of the first container 10a. At this moment, the fluid discharge hole 71 and the suction hole 72 of the sealing component 70a are connected to the internal space of the first container 10a but are not connected to the outside of the extraction device 1a. In addition, the sealing component 70a may be made of soft material, such as silicone or rubber, and its compressibility and deformability characteristics can ensure the airtightness of the sealing component 70a to the first container 10a.

As discussed above, before the extraction process, the extraction device 1a may have the following preparations: pushing the push button 104 to lift the sealing component 70a, such that the first container 10a can be installed to the ready position with the help of the first guide structure 1031 and the second guide structure 11a, where the first guide structure 1031 and the second guide structure 11a decrease the human error during the installation of the first container 10a, and by doing so, the first container 10a can activate the position detector D to let the user know whether the first container 10a is actually in the desired position; then, releasing the push button 104 to let the sealing component 70a to automatically down to the lower position to seal the first container 10a; then, assembling the second container 20 to the casing 100a; and then, assembling the stirring assembly 80 to the casing 100a. As such, the fluid channel and air channel of the extraction device 1a are isolated from the outside and airtight, where the fluid channel may include the internal space of the second container 20, the fluid channel 40, and the internal space of the first container 10a, and the air channel may include the internal space of the second container 20, the air suction device 50, the air suction channel 60, and the internal space of the first container 10a. Therefore, the preparations before the extraction process are just a few simple steps, and that is easy and convenient to the user and only requires a minimal effort.

Therefore, it is understood that the operation process before the extraction process may include: an optional step to press the power button to turn on the extraction device 1a; placing the first container 10a in position by the cooperation of the first guide structure 1031 and the second guide structure 11a, such that the first container 10a can be sealed and covered by the sealing component 70a; and placing the second container 20 in position. Herein, the position detectors D and D' are able to automatically determine whether the first container 10a and the second container 20 are in the desired positions; that is to detect, for example, whether the first container 10a is airtight. Then, the filter 22 (shown in FIG. 5) is placed into the second container 20, and then a suitable amount of solid content (e.g., ground coffee) and liquid (e.g., water) are added into the second container 20. Then, the stirring assembly 80 is installed on the second container 20, such that the stirring piece 810 (shown in FIG. 5) is in the second container 20 and can be partially immersed in the mixture of the liquid and the solid content. By then, the preparation before performing the pressure-decreasing process is completed.

Figure 7:
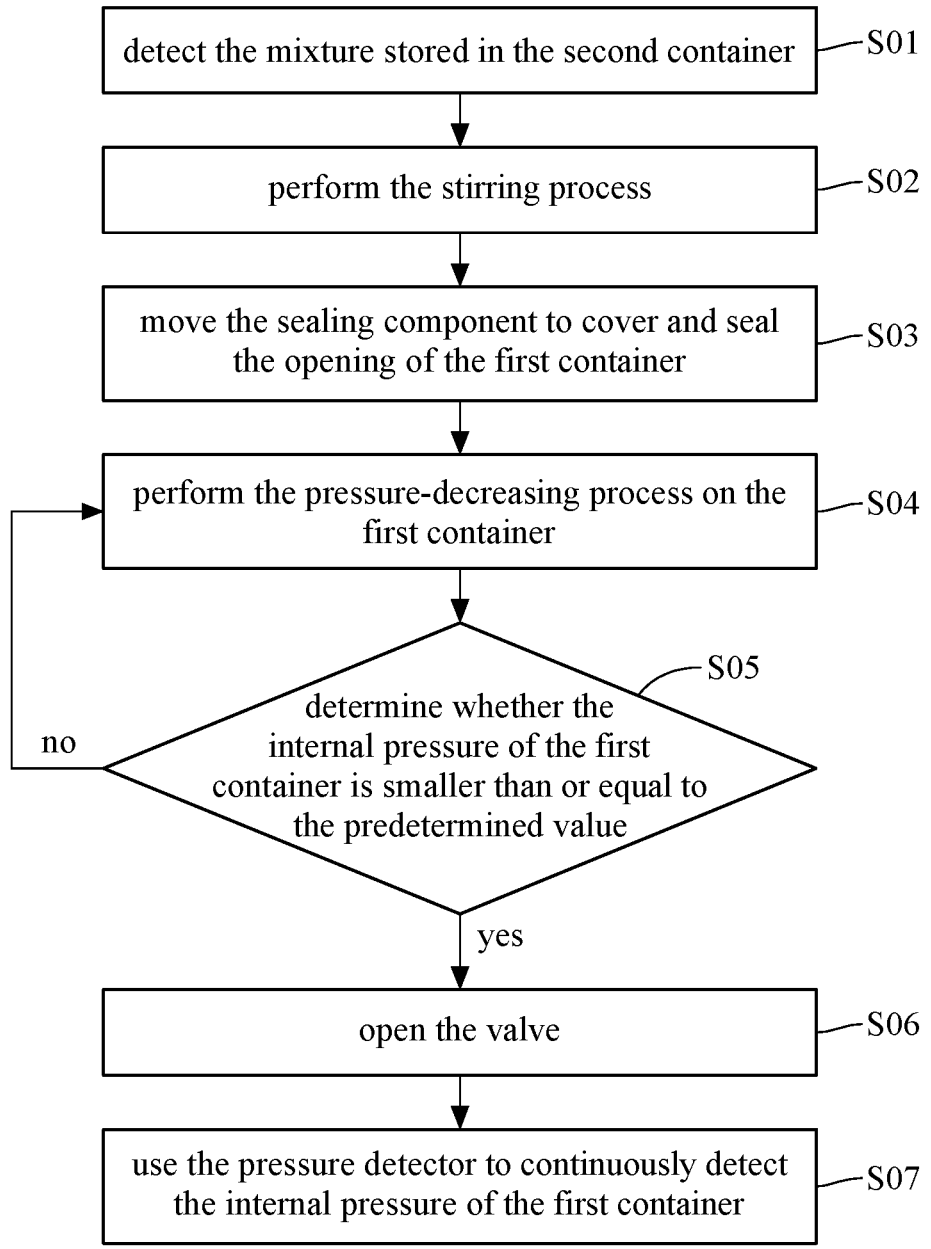
FIG. 7 is a flow chart of an extracting method of the disclosure.

Then, the user can press the extraction start button to activate the extrication device 1a to begin the extraction process. Please refer to the previous drawings and further refer to FIG. 7, where FIG. 7 is a flow chart of an extracting method of the disclosure. Firstly, step S01 is to detect the mixture stored in the second container 20. In detail, in step S01, there are one or more detectors (not shown) in or on the second container 20 to detect whether the second container 20 contains the liquid and the solid content or to further detect whether the amount of the mixture of the liquid and the solid content is sufficient, and the result can be a factor for determining whether the preparation before performing the pressure-decreasing process is completed. If the second container 20 does not contain the mixture or the amount of the mixture is insufficient, the detector may send a signal to the control center to cause the control center to activate warning light to notice the user, so the user can be aware whether the mixture is not yet added or the amount of the mixture is insufficient for the current extraction process. Note that the disclosure is not limited to the detector, how the detector works, and the actual amount meant by the "sufficient".

When the step S01 determines that the second container 20 has a sufficient amount of the mixture, the step S02 is executed to perform a stirring process. During the stirring process, the stirring piece 810 moves within the second container 20 so as to stir or agitate the mixture in the second container 20. In detail, in step S02, the control center activates the motor 830, and the motor 830 moves the stirring piece 810 via the transmission component 820 so that the stirring piece 810 starts to stir or agitate the water and the soluble substances in the second container 20 for a certain period of time. Note that the route and speed of the stirring piece 810 relative to the second container 20 can be adjusted according to the actual requirements and the disclosure is not limited thereto.

Then, step S03 is to move the sealing component 70a to cover and seal the opening O of the first container 10a. In detail, before performing the pressure-decreasing process on the first container 10a, the first container 10a must be sealed, thus the sealing component 70a can be triggered and moved to seal the opening O of the first container 10a.

Then, step S04 is to perform the pressure-decreasing process on the first container 10a. In detail, in the pressure-decreasing process, the control center activates the air suction device 50 so that the air suction device 50 starts to suck the internal air of the first container 10a via the air suction channel 60 so as to decrease the internal pressure of the first container 10a. Note that the pressure-decreasing process can be performed at a fixed or variable rate and the disclosure is not limited thereto.

Meanwhile, step S05 is to determine whether the internal pressure of the first container 10a is smaller than or equal to the predetermined value. If not, meaning when the internal pressure of the first container 10a is determined to be larger than the predetermined value (in other words, the internal pressure of the first container 10a does not yet reach the predetermined value, or meaning that the pressure difference between the first container 10a and the second container 20 does not yet satisfy the requirement of the current extraction process), the step S04 will be kept performing so that the step of performing the pressure-decreasing process is continued. Before the internal pressure of the first container 10a is determined to be smaller than or equal to the predetermined value, the valve 30 is in the closed state in order to prevent the liquid substances in the second container 20 from flowing into the first container 10a via the fluid channel 40.

If the result of the step S05 is yes, meaning that the internal pressure of the first container 10a is determined to be smaller than or equal to the predetermined value (in other words, the internal pressure of the first container 10a reaches or is already smaller than the predetermined value, or meaning that the pressure difference between the first container 10a and the second container 20 satisfies the requirement of the current extraction process), then the step S06 will be executed to open the valve 30. In step S06, the valve 30 is activated, meaning that the valve 30 is opened, the valve 30 can fluidly connect the first container 10a to the second container 20 so that the soluble substances from the solid content in the second container 20 can be extracted within a short period of time caused by the pressure difference between the first container 10a and the second container 20, and the soluble substances will be dissolved in the liquid and flow into the first container 10a via the fluid channel 40. As a result, the solution, that contains the liquid and the soluble substances, will be collected in the first container 10a and become the final product—the brew coffee.

The aforementioned extracting method and its order are exemplary and can be modified, adjusted or partially omitted according to the actual requirements. For example, the step of pressing the power button to activate the extraction device can be placed after the steps of placing the first and second containers and filling the liquid and solid contents into the second container; in another example that has no need to stir the liquid and solid contents, the aforementioned step S02 can be omitted; and in some embodiments, there may be no need to detect the mixture of the second container, so the step S01 may be omitted. However, the disclosure is not limited to the above modification.

In addition, it is understood that, before the air suction device 50 sucks air, performing the stirring process on the liquid and solid contents in the second container 20 has an important compact on the extraction rate. For example, Table 1 shown below is an experiment result using five groups of Kenya coffee beans, where the ratio of the water and the ground coffee and the water temperature are the same among these groups. In Table 1, TDS (%) (Total Dissolved Solids)=extracted components(g)/coffee solution (ml), is the ratio of the dissolved soluble substances to the water, that is, the ratio of the flavor compounds to the coffee solution, and BRIX (%)=extracted components(g)/ground coffee(g), that is, the extraction rate. As shown in Table 1, among the groups 1-3 that have the same wetting time, the longer stirring time, the higher extraction rate; and among the groups 2 and 4-5 that have the same stirring time, the longer wetting time, the higher extraction rate.

TABLE 1

| No. | stirring time (second) | wetting time (minute) | TDS(%) | BRIX(%) |
|---|---|---|---|---|
| 1 | 50 | 3 | 1.54 | 15.4 |
| 2 | 60 | 3 | 2.08 | 20.8 |
| 3 | 70 | 3 | 2.30 | 23 |

TABLE 1-continued

| No. | stirring time (second) | wetting time (minute) | TDS(%) | BRIX(%) |
|---|---|---|---|---|
| 4 | 60 | 2 | 1.55 | 15.5 |
| 5 | 60 | 4 | 2.30 | 23 |

It is understood that the stirring process can be omitted when the liquid and solid contents in the second container 20 had been well mixed or do not need to be well mixed, but the disclosure is not limited thereto.

Figure 8:
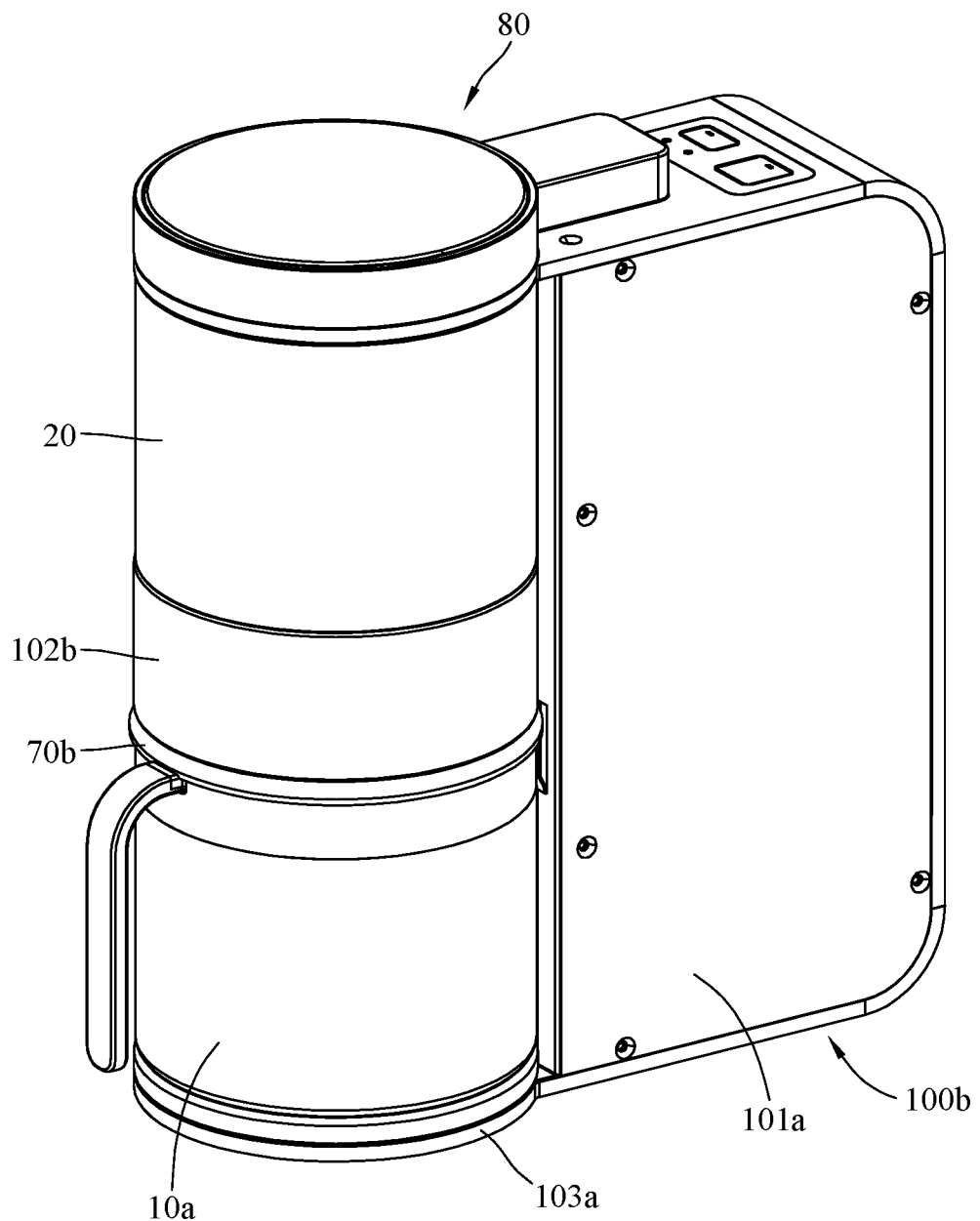
FIG. 8 is a perspective view of an extraction device according to another embodiment of the disclosure.
Figure 9:
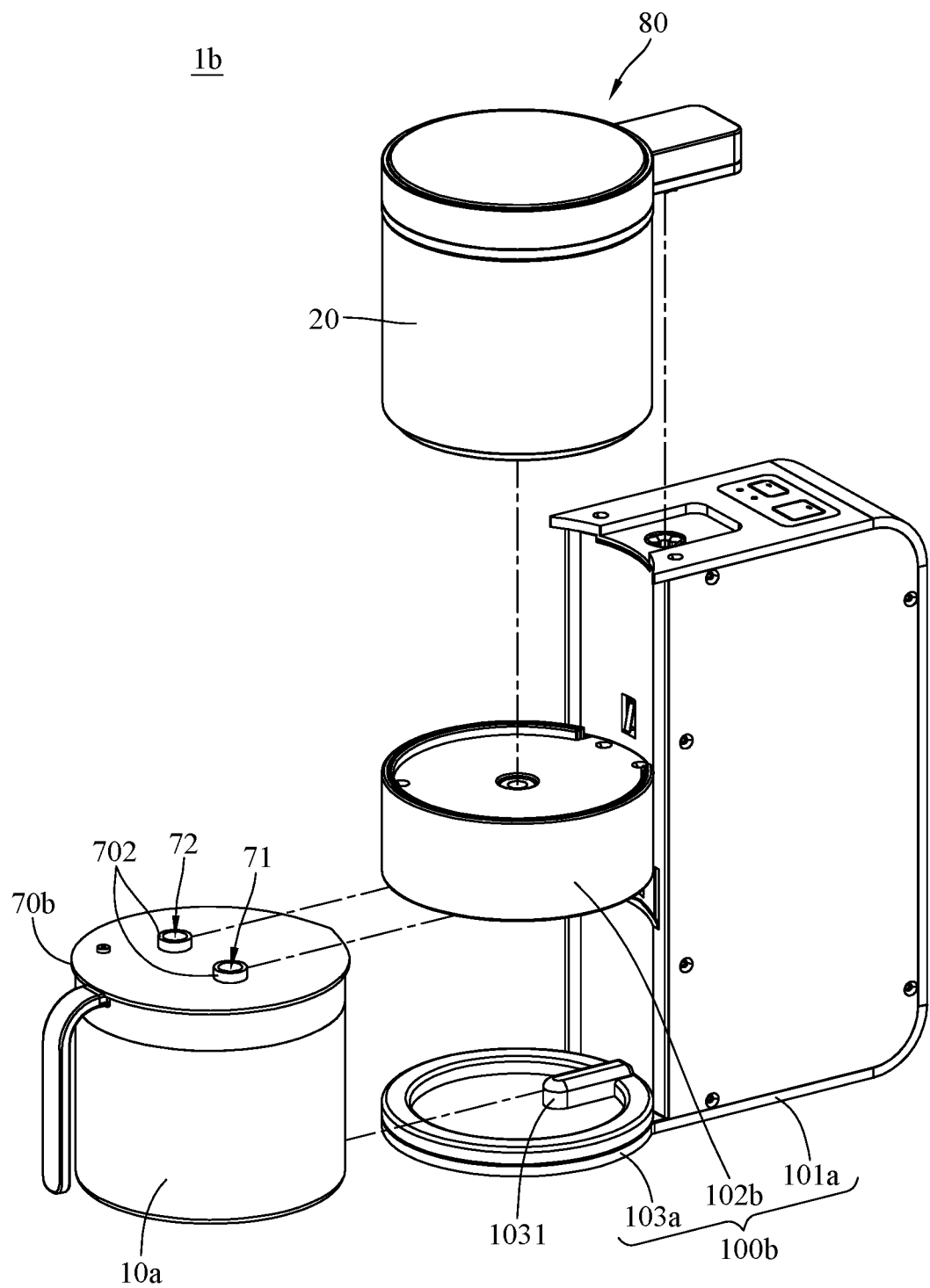
FIGS. 9-10 are exploded views of the extraction device in FIG. 8, taken from different viewpoints.
Figure 10:
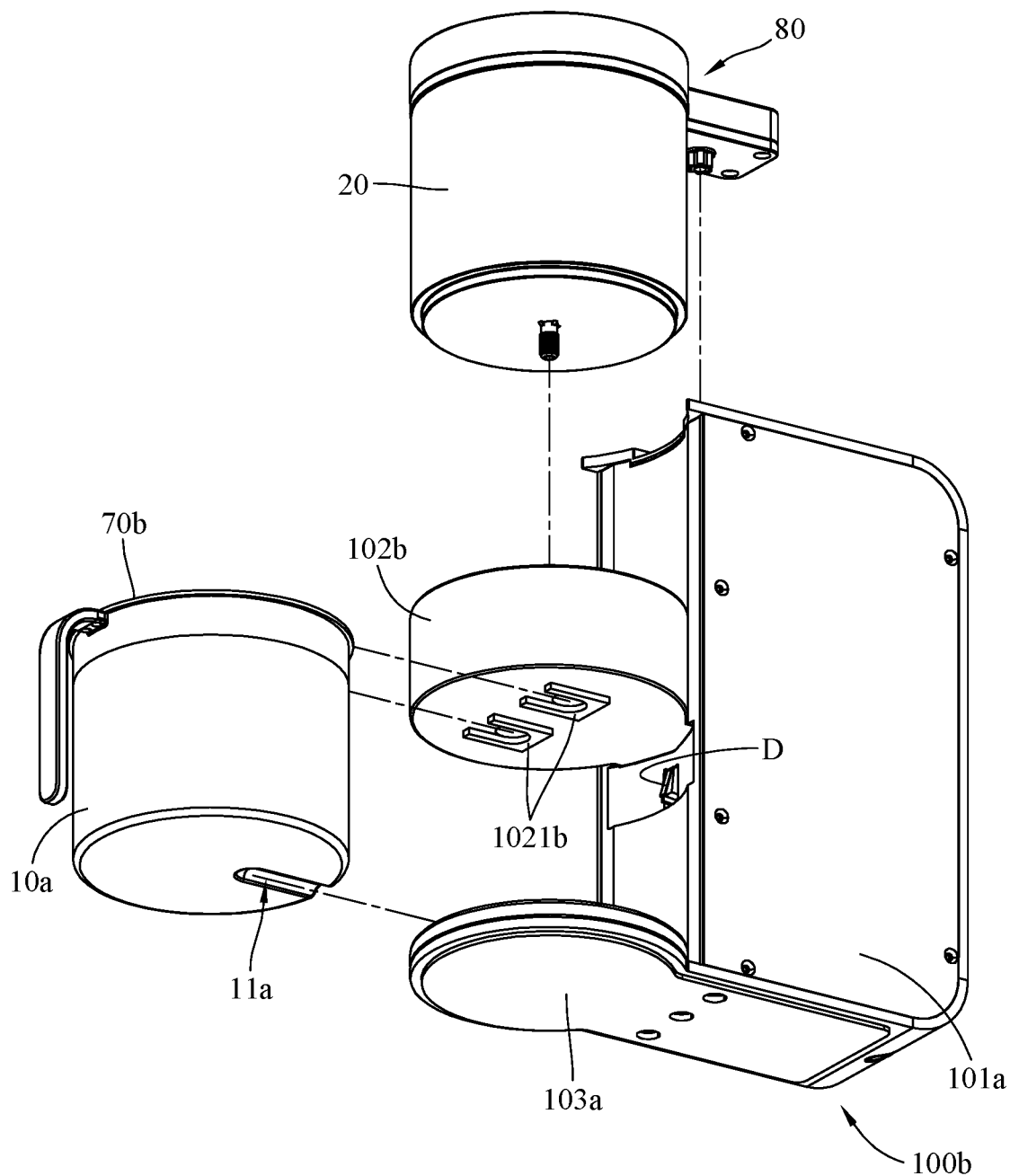
Figure 11:
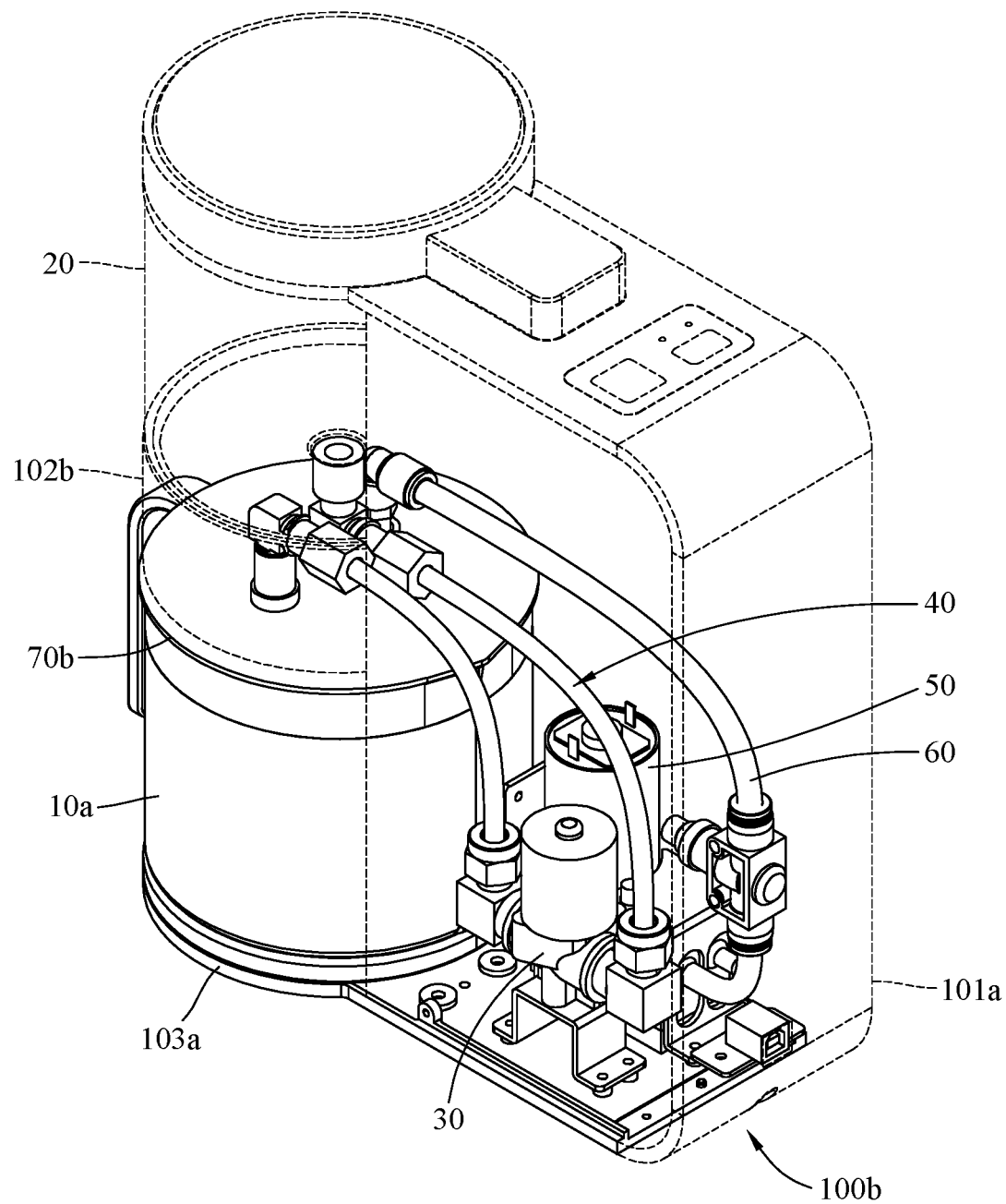
FIG. 11 is a perspective view showing the interior of the extraction device in FIG. 8.

In addition, the disclosure is not limited to the aforementioned extraction device 1a. Please refer to FIGS. 8-11, where FIG. 8 is a perspective view of an extraction device according to another embodiment of the disclosure, FIGS. 9-10 are exploded views of the extraction device in FIG. 8, taken from different viewpoints, and FIG. 11 is a perspective view showing the interior of the extraction device in FIG. 8. This embodiment provides an extraction device 1b similar to the extraction device 1a in the previous embodiment.

The main differences between these two embodiments are the ways of installing and sealing the first container, so only the differences from the previous embodiment will be explained in the following paragraphs, and the similar parts, such as the extraction process, can be referred to the previous descriptions and will not be repeated.

In this embodiment, the extraction device 1b includes a casing 100b and a sealing component 70b, where the sealing component 70b is detachably disposed on the first container 10a and configured to cover and seal the opening O of the first container 10a. The casing 100b includes a connecting casing part 102b. At least one first positioning structure 1021b is disposed on a side of the connecting casing part 102b facing the tray part 103a, and at least one second positioning structure 702 is disposed on a side of the sealing component 70b facing away from the first container 10a. In this embodiment or some other embodiments, there may be two first positioning structures 1021b, and each first positioning structure 1021b is, for example, a structure having a groove; and there may be two second positioning structures 702, and each second positioning structure 702 is, for example, a protrusion that fits the groove. However, the disclosure is not limited to the locations and configurations of the first positioning structures 1021b and the second positioning structures 702. When the first container 10a is placed on the tray part 103a, the second positioning structures 702 are removably and slidably located on the first positioning structures 1021b, ensuring that the first container 10a can be moved to the ready position (as shown in FIG. 8). As the first container 10a is in position, the fluid discharge hole 71 and the suction hole 72 of the sealing component 70b are respectively aligned with and connected to the ports of the fluid channel 40 and the air suction channel 60, achieving the airtightness of the first container 10a.

Figure 12:
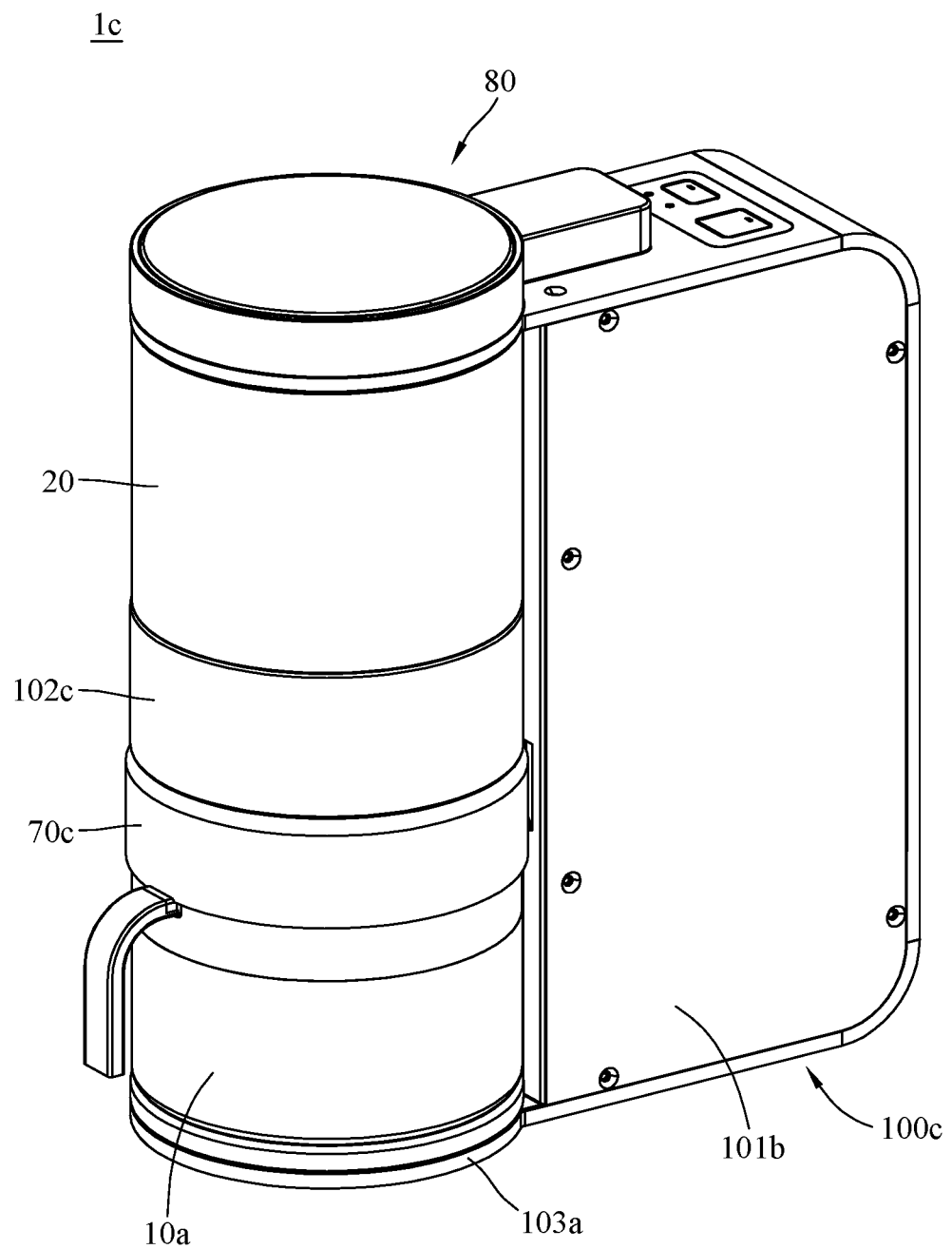
FIG. 12 is a perspective view of an extraction device according to further another embodiment of the disclosure.
Figure 13:
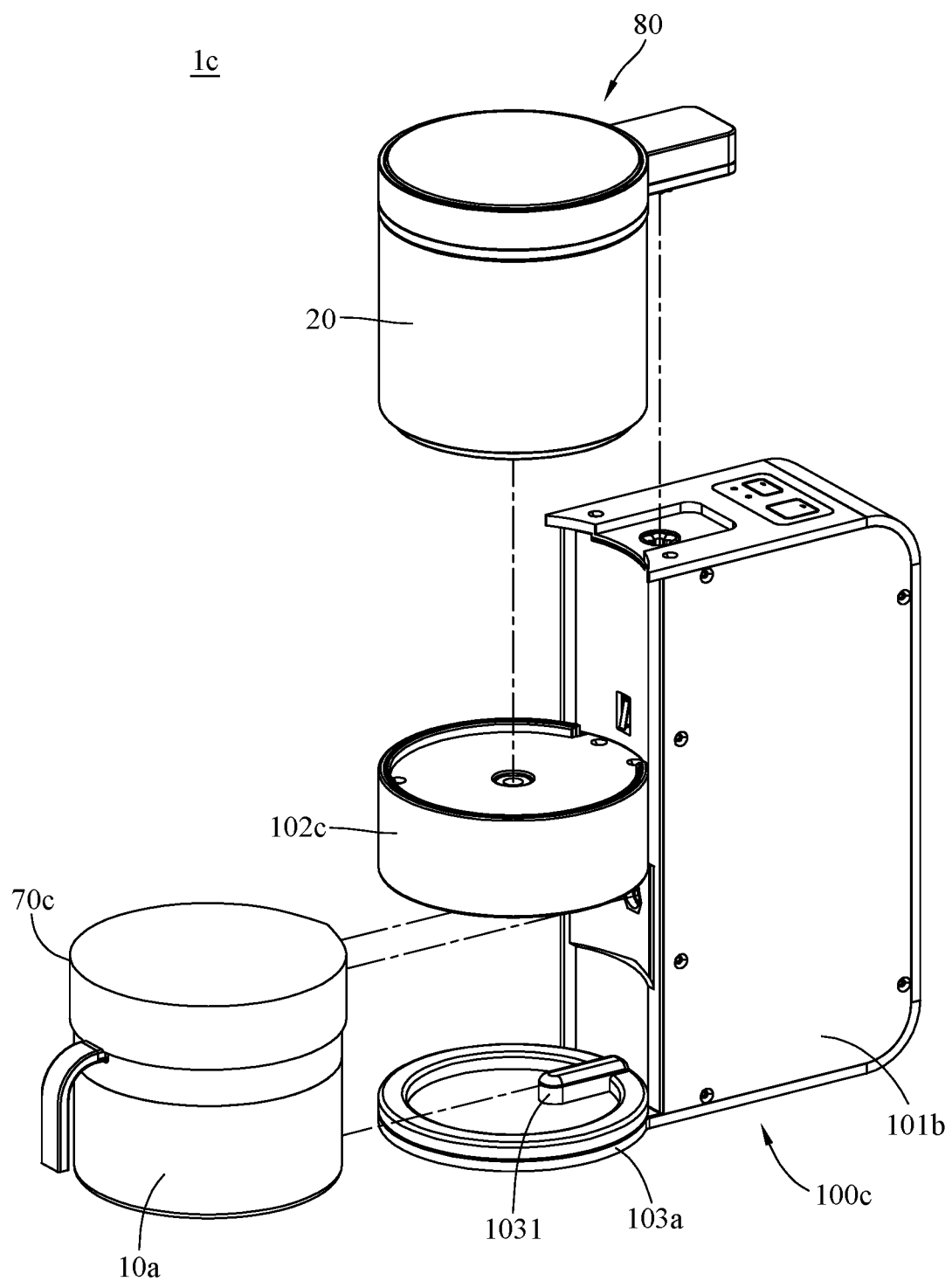
FIGS. 13-14 are exploded views of the extraction device in FIG. 12, taken from different viewpoints.
Figure 14:
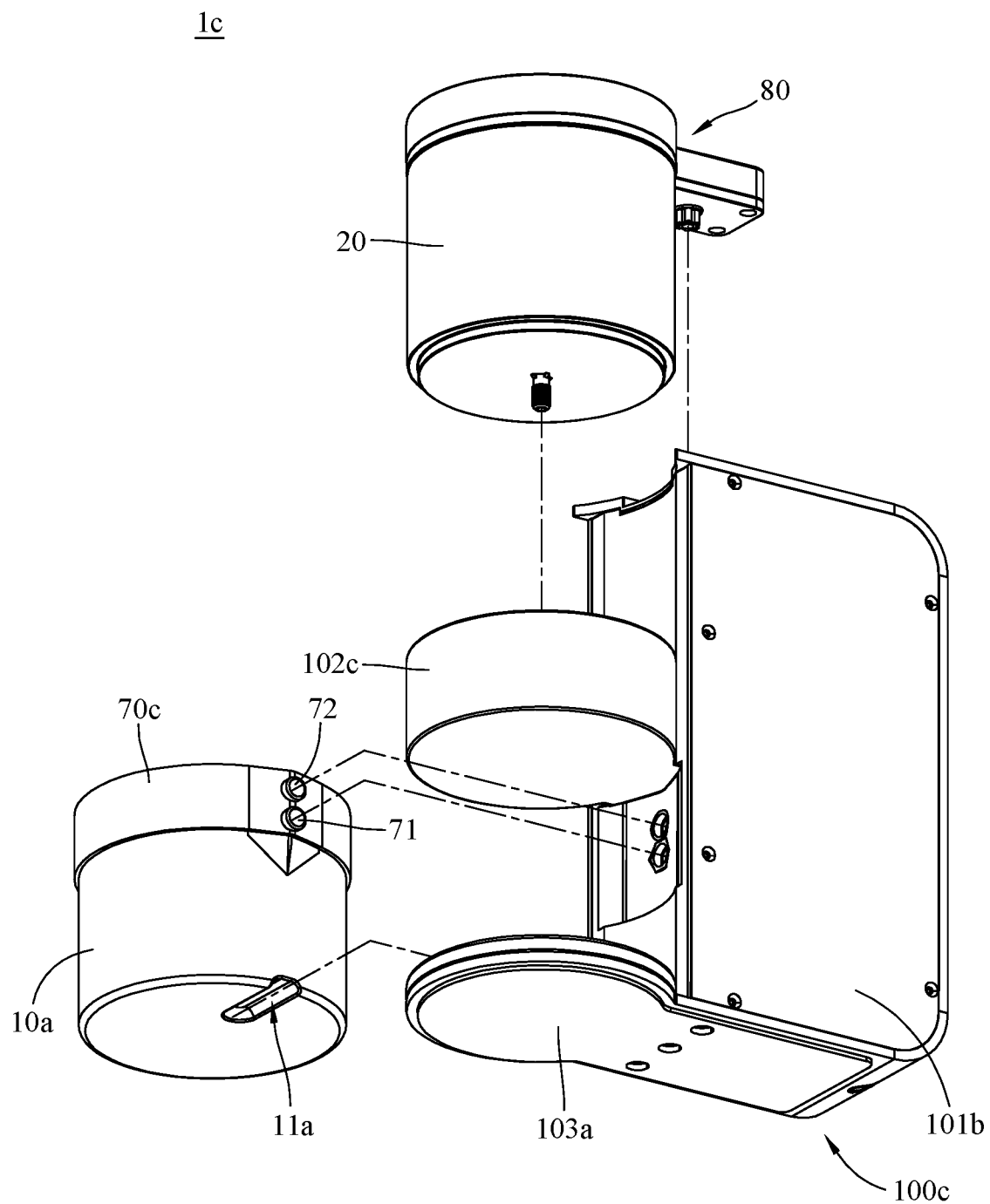
Figure 15:
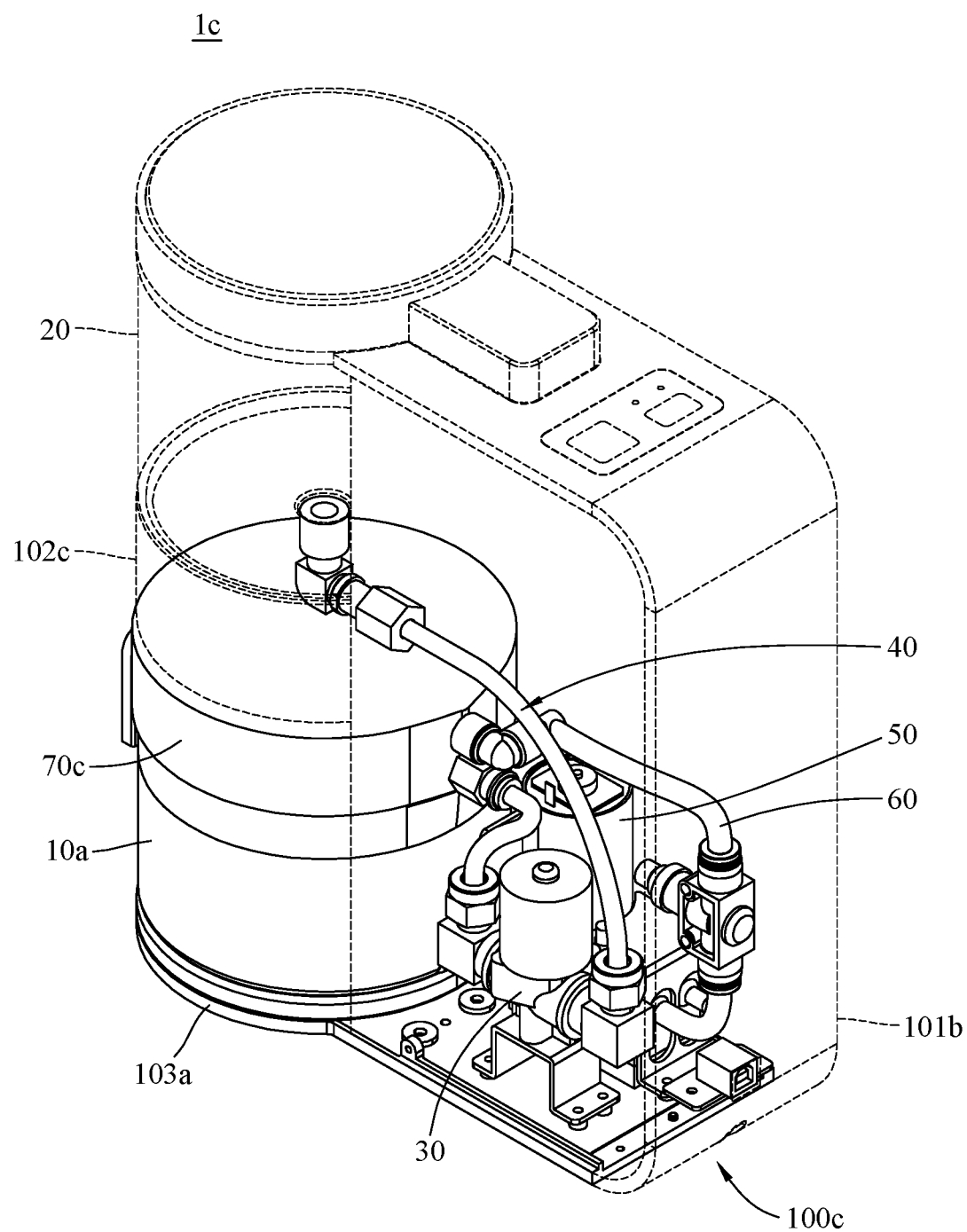
FIG. 15 is a perspective view showing the interior of the extraction device in FIG. 12.

Alternatively, please refer to FIGS. 12-15, where FIG. 12 is a perspective view of an extraction device according to further another embodiment of the disclosure, FIGS. 13-14 are exploded views of the extraction device in FIG. 12, taken from different viewpoints, and FIG. 15 is a perspective view showing the interior of the extraction device in FIG. 12. This embodiment provides an extraction device 1c similar to the extraction devices 1a and 1b in the previous embodiments. The main differences from the extraction devices 1a and 1b are the ways of installing and sealing the first container, so only the differences will be explained in the following paragraphs, and the similar parts, such as the extraction process, can be referred to the previous descriptions and will not be repeated.

In this embodiment, the extraction device 1c includes a casing 100c and a sealing component 70c. The casing 100c includes a main casing part 101b and a connecting casing part 102c. The sealing component 70c is detachably disposed on the first container 10a and configured to cover and seal the opening O of the first container 10a. The fluid discharge hole 71 and the suction hole 72 of the sealing component 70c are located on a side of the sealing component 70c facing the main casing part 101b. The ports of the fluid channel 40 and the air suction channel 60 are located and exposed from a side of the main casing part 101b and are not located at the connecting casing part 102c. Therefore, when the first container 10a is placed on the tray part 103a, the fluid discharge hole 71 and the suction hole 72 of the sealing component 70c are able to be respectively connected to the fluid channel 40 and the air suction channel 60, achieving the airtightness of the first container 10a.

Figure 16:
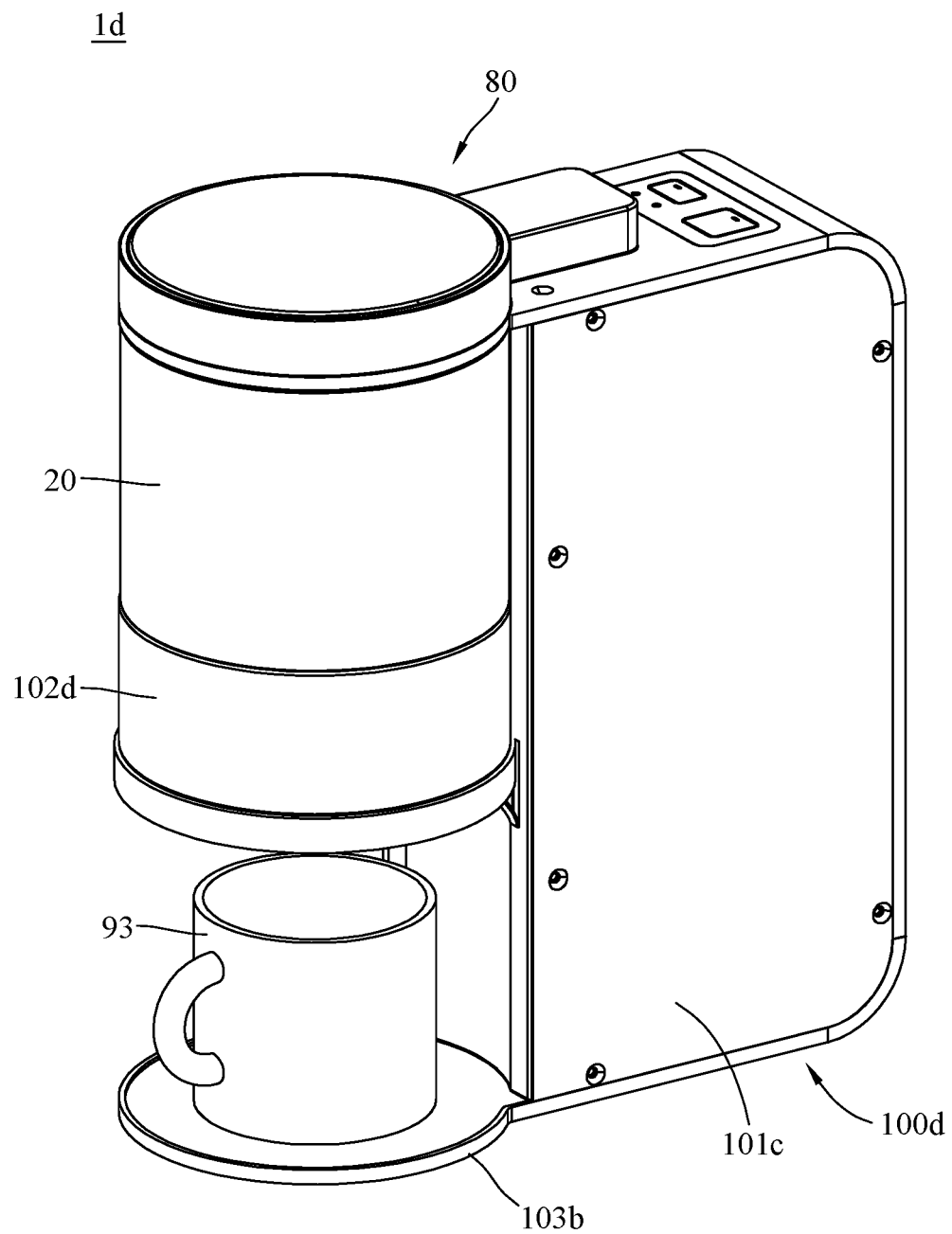
FIG. 16 is a perspective view of an extraction device according to still another embodiment of the disclosure.
Figure 17:
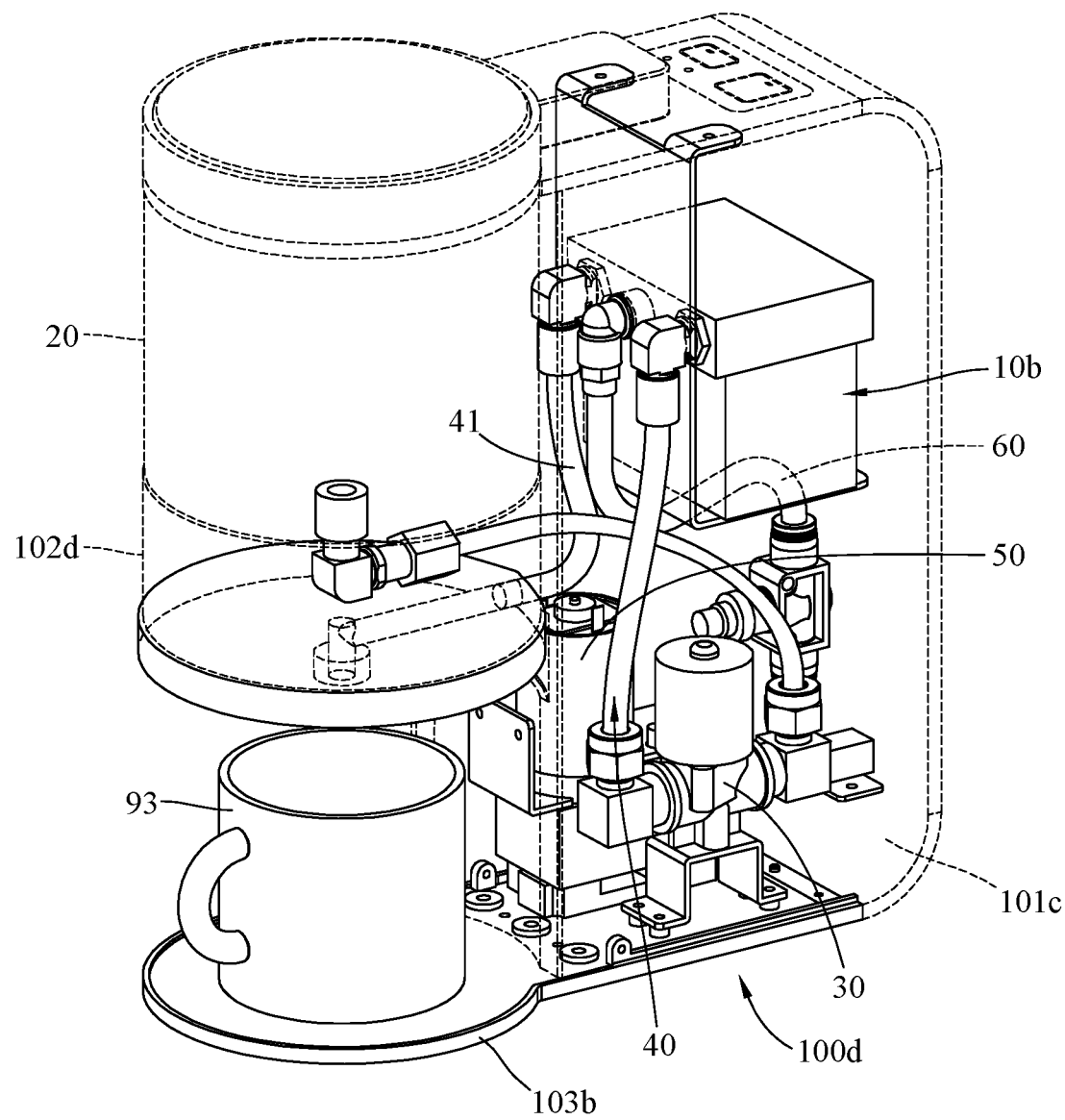
FIG. 17 is a perspective view showing the interior of the extraction device in FIG. 16.

Further, the disclosure is not limited to the location of the first container. For example, please refer to FIGS. 16-17, where FIG. 16 is a perspective view of an extraction device according to still another embodiment of the disclosure, and FIG. 17 is a perspective view showing the interior of the extraction device in FIG. 16. This embodiment provides an extraction device 1d similar to the extraction devices 1a-1c in the previous embodiments. The main difference from the previous embodiments is the location of the first container, so only the difference will be explained in the following paragraphs, and the similar parts, such as the extraction process, can be referred to the previous descriptions and will not be repeated.

In this embodiment, the extraction device 1d includes a casing 100d, a liquid suction channel 41 and a first container 10b. The casing 100d includes a main casing part 101c, a connecting casing part 102d, and a tray part 103b. The first container 10b is disposed within the main casing part 101c, and the fluid channel 40 is accommodated in the casing 100d and does not penetrate the connecting casing part 102d. One end of the liquid suction channel 41 is detachably connected to the first container 10b, and another end of the liquid suction channel 41 is disposed on the connecting casing part 102d and exposed from a side of the connecting casing part 102d facing the tray part 103b. Therefore, the first container 10b in the casing 100d can be connected to the outside via the liquid suction channel 41. In this embodiment, there may be a pump (not shown) disposed in the main casing part 101c and connected to the liquid suction channel 41 so as to discharge the solution in the first container 10b via the liquid suction channel 41. As shown in FIG. 17, the solution can be discharged to a mug 93 on the tray part 103b.

As such, the first container 10b can be considered as a space for temporarily store the final product (e.g., the cold brew coffee), such that the extraction device 1d can have a certain stock of ready-to-drink beverage. In this or some other embodiments, the extraction device 1d can be bigger in size to accommodate a larger first container 10b, such that the extraction device 1d can have a larger stock. Therefore, the extraction device 1d may have a larger and sufficient amount of cold brew coffee than that in the previous embodiments, thus the extraction device 1d is more suitable for the application that requires to offer a large amount of brew coffee in a short period of time. In addition, a side of the main casing part 101c has a detachable plate to give the user an access to install or remove the first container 10b, but the disclosure is not limited to the design of the main casing part 101c and how to open the main casing part 101c.

Figure 18:
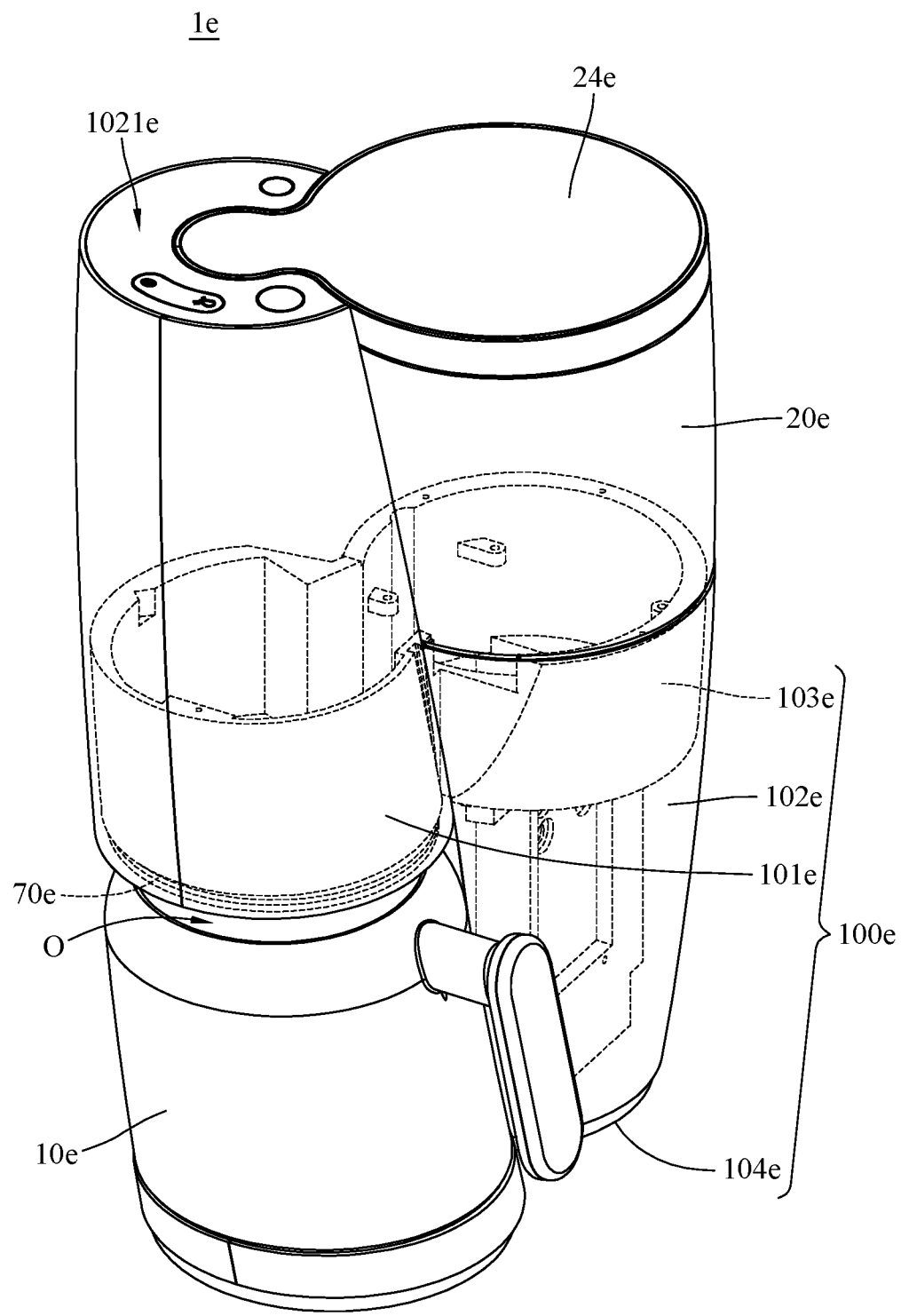
FIG. 18 is perspective view of an extraction device according to yet still another embodiment of the disclosure.
Figure 19A:
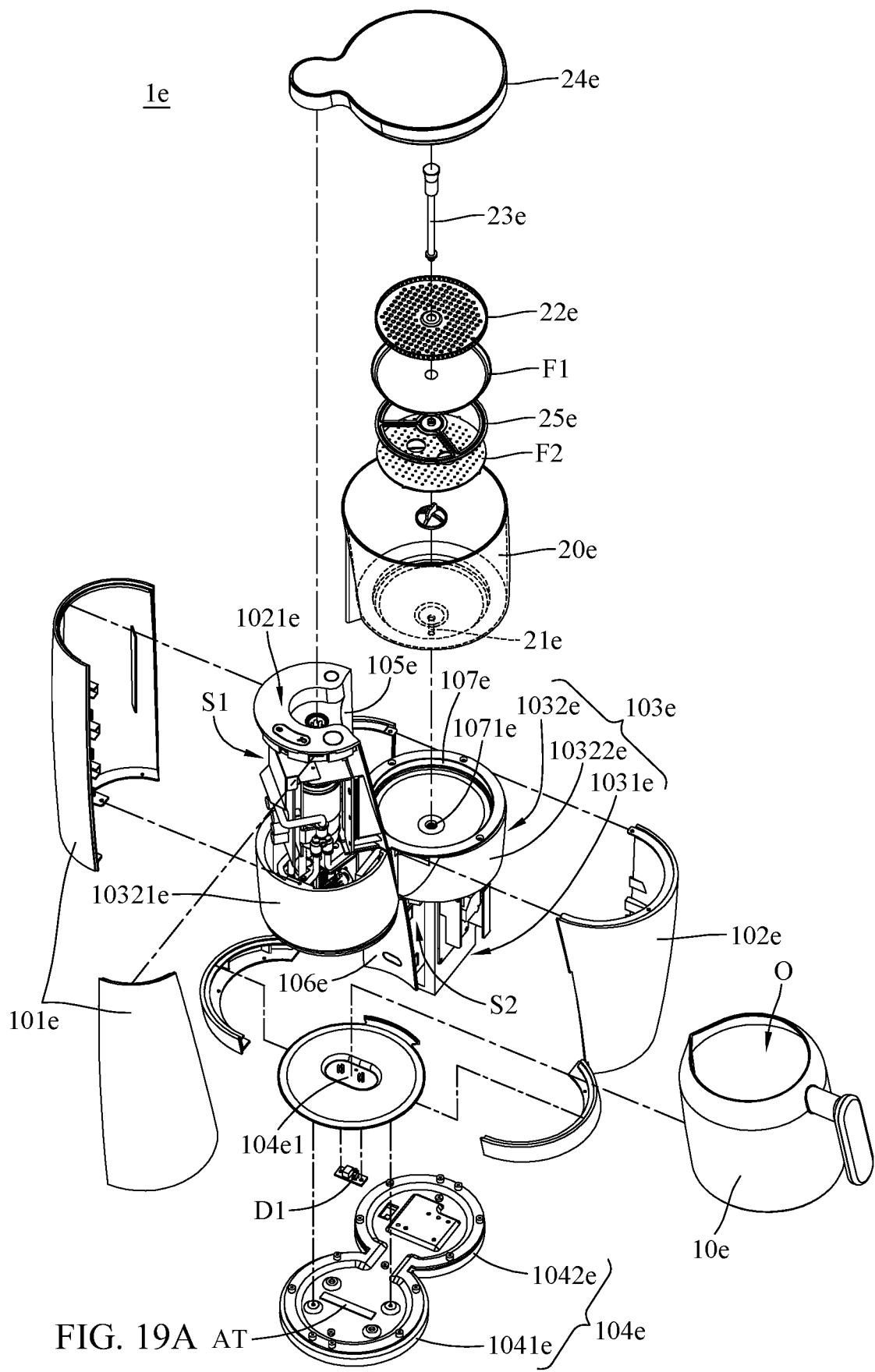
FIGS. 19A-19B are exploded views of the extraction device in FIG. 18 taken from different viewpoints.
Figure 19B:
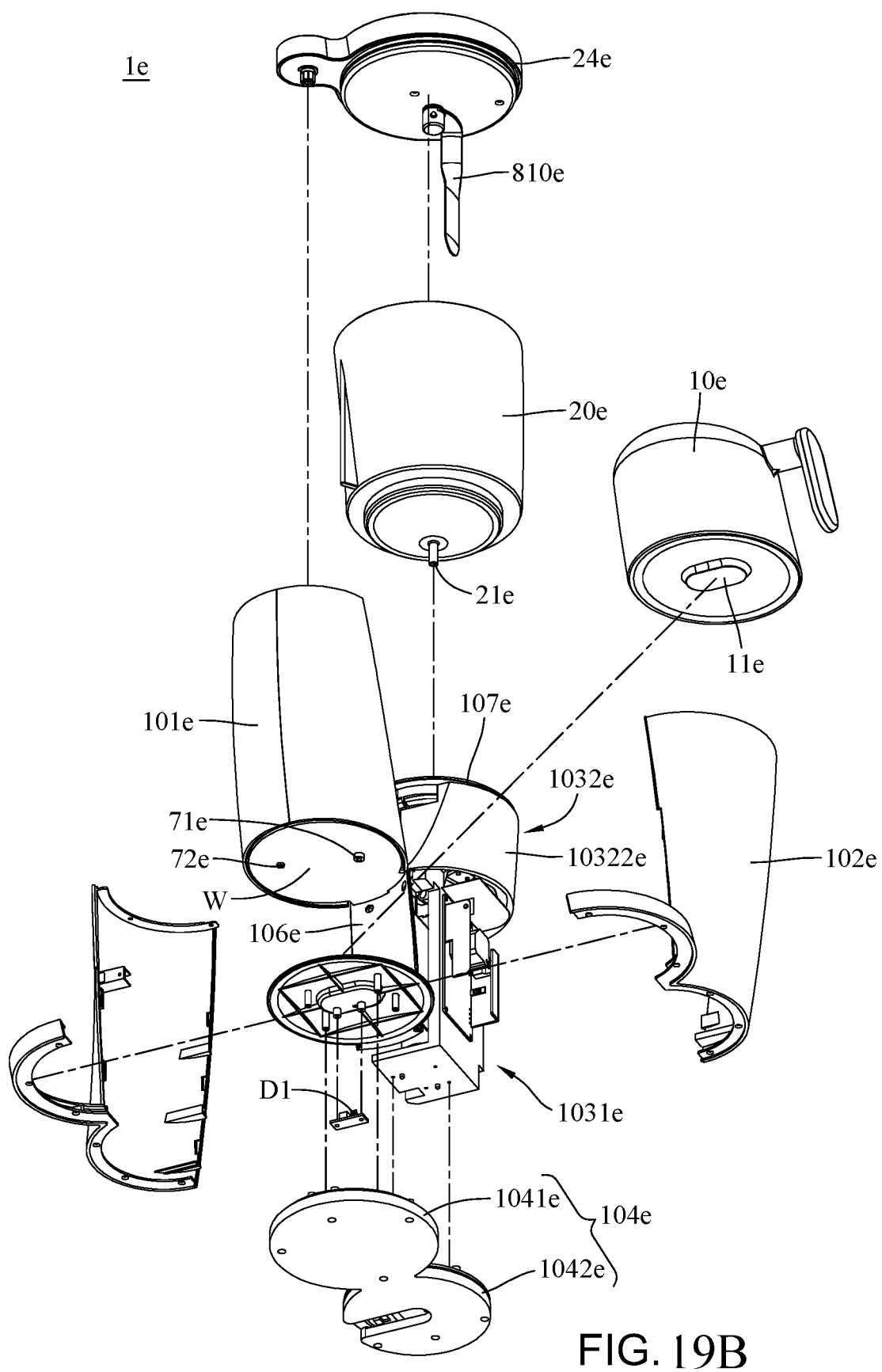
Figure 20A:
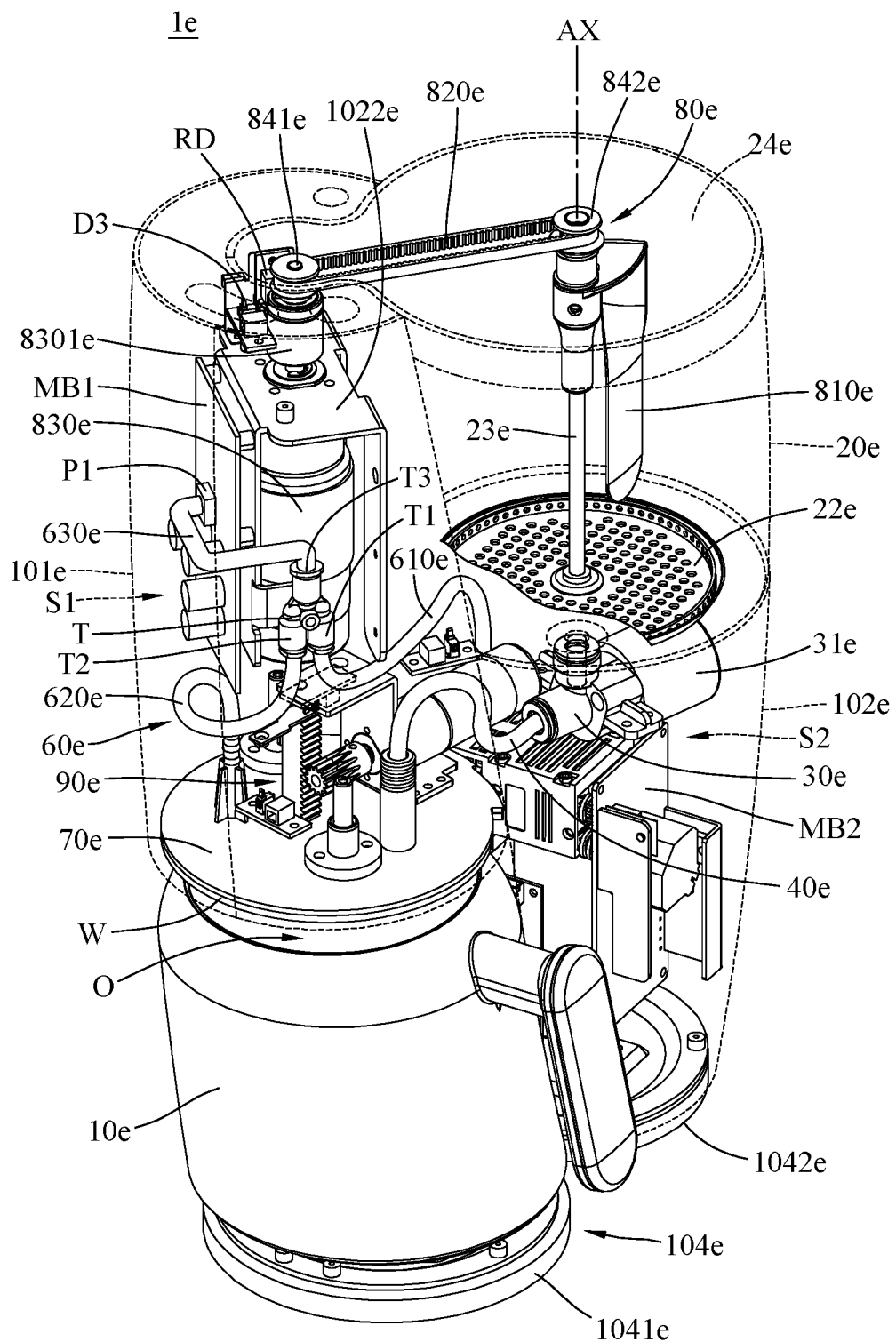
FIGS. 20A-20B are internal view of the extraction device in FIG. 18.
Figure 20B:
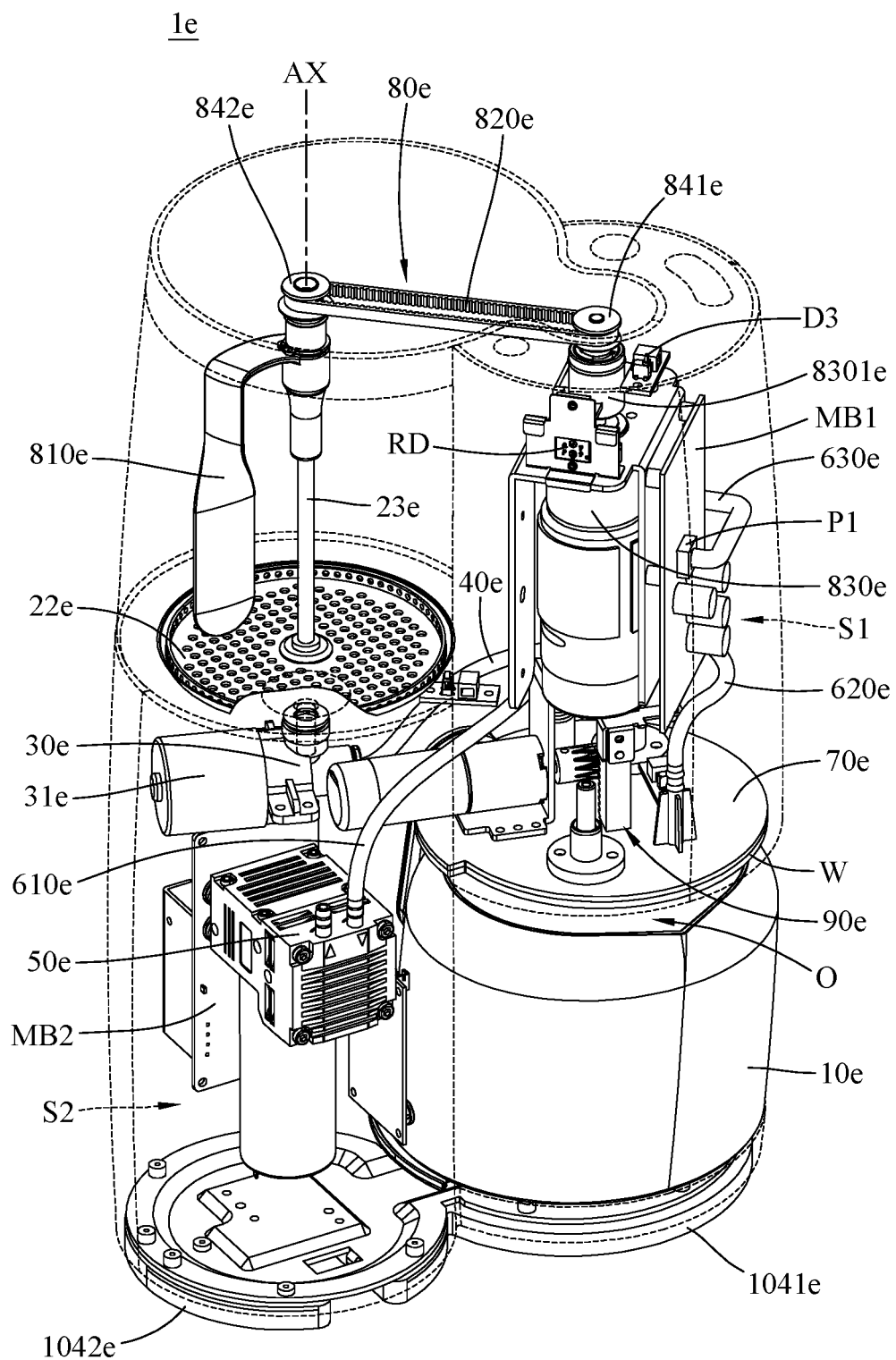
Figure 21A:
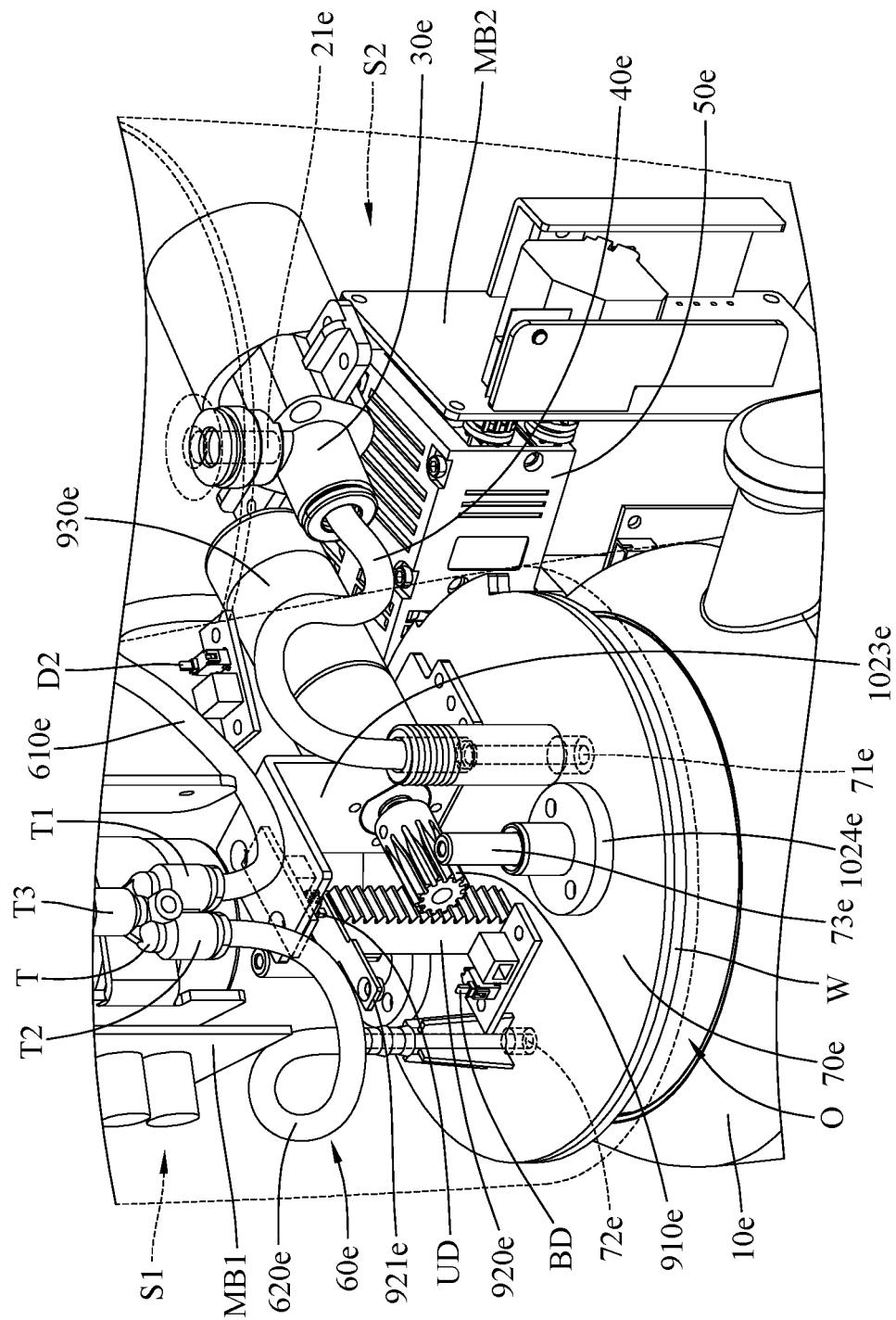
FIGS. 21A-21B show enlarged and partially cross-sectional views of the extraction device in FIG. 18.
Figure 21B:
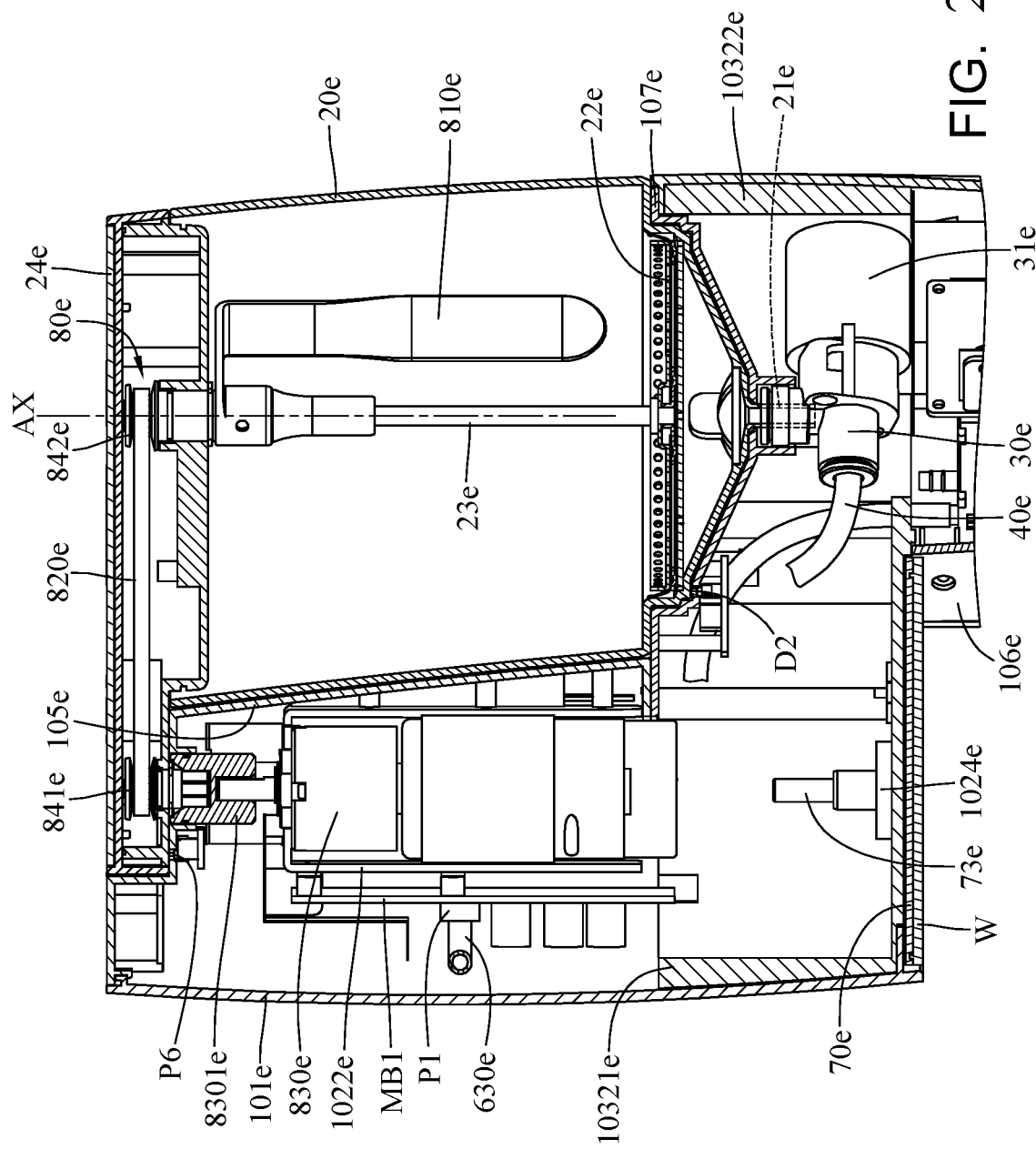

Then, referring to FIGS. 18-20B, the disclosure provides an extraction device 1e, where FIG. 18 is perspective view of an extraction device 1e according to yet still another embodiment of the disclosure, FIGS. 19A-19B are exploded views of the extraction device 1e in FIG. 18 taken from different viewpoints, and FIGS. 20A-20B are internal view of the extraction device 1e in FIG. 18. Note that the following paragraphs mainly introduce the differences between this and the previous embodiments, such as some additional features not mentioned in the previous embodiments and some actual examples of the features mentioned in the previous embodiments.

In this embodiment, the extraction device 1e at least includes a first container 10e, a second container 20e, a valve 30e, a fluid channel 40e, an air suction device 50e and an air suction channel 60e. Note that the purposes of the first container 10e, the second container 20e, the valve 30e and the fluid channel 40e are the similar to that of the previous embodiments.

In this or some other embodiments, the valve 30e is equipped with a motor 31e, and the motor 31e is configured to open or close the valve 30e. However, the disclosure is not limited to the motor 31e shown in the figures, and any other suitable devices that can control the valve 30e can be an alternative of the motor 31e.

Similarly, the air suction channel 60e is also an air channel connected to both the air suction device 50e and the first container 10e. The air suction channel 60e can be, but not limited to, consisted of one or more air tubes, and the disclosure is not limited thereto. In detail, as shown in FIGS. 20A and 20B, the air suction channel 60e includes a first air tube 610e, a second air tube 620e, a third air tube 630e and a three-way joint T, where the three-way joint T at least has three connectors connected to one another, e.g., a first connector T1, a second connector T2 and a third connector T3. The first air tube 610e is connected to the air suction device 50e and the first connector T1 of the three-way joint T, the second air tube 620e is connected to the first container 10e and the second connector T2 of the three-way joint T, and the third air tube 630e is connected to the third connector T3 of the three-way joint T and a pressure detector P1. Note that the pressure detector P1 is connected to the air suction channel 60e so that the pressure detector P1 is able to detect or measure the internal pressure of the first container 10e by detecting the internal pressure of the air suction channel 60e.

The above is an example of how the pressure detector P1 access the internal pressure of the first container 10e, but the disclosure is not limited thereto. In some other embodiments, depending on the actual requirements, the pressure detector P1 may be disposed on the air suction device 50e or disposed on any tube that is connected to the air suction device 50e. In addition, the disclosure is either not limited to the type or design of the pressure detector P1, and any other suitable device that can detect air pressure can be taken as an alternative of the pressure detector P1.

In this and some other embodiments, when the pressure detector P1 detects that the internal pressure of the first container 10e is decreased to be smaller than or equal to the predetermined value, the difference between the internal pressure of the first container 10e and the second container 20e is considered to be satisfying the requirement of the current extraction process. At this moment, the valve 30e will be opened and allow the water in the second container 20e to flow to the first container 10e via the fluid channel 40e and thus causing the soluble substances in the ground coffee to be dissolved and flowing to the first container 10e with the water to become the brew coffee.

In this embodiment, the extraction device 1e further includes a casing 100e, where the casing 100e includes a first outer casing body 101e, a second outer casing body 102e, an inner casing body 103e and a carrier base 104e.

In FIG. 18, the carrier base 104e is the part of the extraction device 1e for supporting other components and being placed on flat surface during normal use. The inner casing body 103e is disposed on the carrier base 104e to become a frame for supporting some components of the extraction device 1e. In detail, in this embodiment, the inner casing body 103e includes a stand portion 1031e and a frame portion 1032e, the stand portion 1031e stands on the carrier base 104e, and the frame portion 1032e can be, but not limited to, made of a single piece and disposed on the stand portion 1031e so as to be located above the carrier base 104e. In more detail, the frame portion 1032e is substantially in the form of number "8" and can include a first frame portion 10321e and a second frame portion 10322e. The shape of the carrier base 104e substantially matches that of the frame portion 1032e so that the carrier base 104e can include a first carrier base part 1041e and a second carrier base part 1042e. The positions of the first carrier base part 1041e and the second carrier base part 1042e respectively correspond to that of the first frame portion 10321e and the second frame portion 10322e, but the positions of these components can be changed according to the actual overall design and the disclosure is not limited thereto.

The first outer casing body 101e can be, but not limited to, made of a single piece or an assembly consisted of plural smaller pieces, and the disclosure is not limited thereto. The first outer casing body 101e is configured to be assembled on and cover the first frame portion 10321e of the frame portion 1032e of the inner casing body 103e. In this embodiment, the first frame portion 10321e and the second frame portion 10322e can have a first partition piece 105e inbetween, and the first outer casing body 101e, the first frame portion 10321e and the first partition piece 105e together form an inner space S1. Part of the fluid channel 40e and part of the air suction channel 60e can be accommodated in the inner space S1.

In addition, in this or some other embodiments, a mainboard MB1 is also accommodated in the inner space S1. The mainboard MB1 can, but not limited to, have various electrical components, such as capacitors, memories, processors or electric circuits, that can be used to control the valve 30e, the air suction device 50e or other electrical or electronic components on the extraction device 1e and can generate feedback signal based on the received signal. Therefore, the mainboard MB1 can be considered as a control center of the extraction device 1e, but the disclosure is not limited to the type, function or quantity of the electrical components on the mainboard MB1. In addition, the aforementioned pressure detector P1 is able to communicate with the mainboard MB1. In this embodiment, the pressure detector P1 can be, but not limited to, disposed on the mainboard MB1 so that the pressure detector P1 can be controlled by the mainboard MB1 or the pressure detector P1 can transmit single to the mainboard MB1.

In addition, a user interface 1021e is disposed on the first outer casing body 101e, and the user interface 1021e can include, but not limited to, various buttons for inputting instruction to the mainboard MB1 and/or sound or light signal emitting device activated by the mainboard MB1. The said buttons (not numbered) may include power button and other buttons for activating the extraction process or setting and menu selection.

The second outer casing body 102e can be, but not limited to, made of a single piece or an assembly consisted of plural smaller pieces, and the disclosure is not limited thereto. The second outer casing body 102e is configured to be disposed on the second carrier base part 1042e of the carrier base 104e and to be assembled on and cover the second frame portion 10322e of the frame portion 1032e of the inner casing body 103e. In this embodiment, the first carrier base part 1041e and the second carrier base part 1042e can have a second partition piece 106e inbetween. The second outer casing body 102e, the second carrier base part 1042e and the second partition piece 106e can together form an inner space S2. The valve 30e and the air suction device 50e can be accommodated in the inner space S2.

In addition, in this or some other embodiments, a mainboard MB2 is also accommodated in the inner space S2. The mainboard MB2 can, but not limited to, have various electrical components, such as capacitors, memories, processors or electric circuits, that can be used to control the aforementioned valve 30e, the air suction device 50e or other electrical or electronic components on the extraction device 1e and can generate feedback signal based on the received signal. However, the disclosure is not limited to the type, function or quantity of the electrical components on the mainboard MB2. Note that the mainboard MB2 may cooperate with the aforementioned mainboard MB1 to share or provide the functions offered by the extraction device 1e.

The aforementioned first container 10e is configured to be arranged on the first carrier base part 1041e of the carrier base 104e and located between the first frame portion 10321e of the frame portion 1032e, the first carrier base part 1041e of the carrier base 104, and the second partition piece 106e. Note that the distance between the first carrier base part 1041e of the carrier base 104e and the first frame portion 10321e of the frame portion 1032e can be changed according to the actual requirements, and the disclosure is not limited thereto.

In more detail, there is a first guide structure 104e1 formed on a surface of the first carrier base part 1041e of the carrier base 104e facing the first container 10e, and there is a second guide structure 11e formed on the bottom surface of the first container 10e. Similar to the previous embodiments, the first guide structure 104e1 and the second guide structure 11e help to position the first container 10e to the ready position. In this embodiment, the first guide structure 104e1 is a round concave, and the second guide structure 11e is a protrusion in a shape mating the first guide structure 104e1. Since the round concave of the first guide structure 104e1, the first container 10e is allowed to be placed onto the carrier base 104e from any angle and is allowed to be rotated relative to the carrier base 104e.

To ensure the ready position of the first container 10e, in this or some other embodiments, the extraction device 1e further includes a first container position detector D1. The first container position detector D1 is a detector that can determine whether the container is positioned by whether it is triggered or not. The first container position detector D1 can be, but not limited to, implemented by pressure, light or touch detecting. The first container position detector D1 is disposed on the carrier base 104e and its trigger or switch (not numbered) is exposed from the surface of the carrier base 104e facing the first container 10e. More specifically, the trigger or switch of the first container position detector D1 is exposed and protrudes from the surface of the first guide structure 104e1. As such, when the first container 10e is placed on the carrier base 104e and correctly reaches the ready position, the second guide structure 11e of the first container 10e triggers the first container position detector D1. At this moment, the first container position detector D1 transmits position signal to the mainboard MB1 via a wired or wireless manner so that the mainboard MB1 determines that the first container 10e is correctly positioned. Note that when the mainboard MB1 did not receive the signal from the first container position detector D1, the mainboard MB1 may activate the sound or light emitting device on the user interface 1021e to warn the user, but the disclosure is not limited thereto.

The second container 20e is configured to be placed on the second frame portion 10322e of the frame portion 1032e and located next to the first partition piece 105e. In this embodiment, there is a support casing body 107e disposed on the second frame portion 10322e of the frame portion 1032e, and the second container 20e is configured to be placed on the support casing body 107e. In detail, the support casing body 107e has a through hole 1071e corresponding to the opening (not numbered) of the valve 30e accommodated in the inner space S2. As such, when the second container 20e is disposed on the support casing body 107e, a discharge connector 21e of the second container 20e is disposed through the through hole 1071e and connected to the opening of the valve 30e, thereby connecting the second container 20e to the valve 30e.

To ensure the position of the second container 20e, in this or some other embodiments, the extraction device 1e includes a second container position detector D2. Similar to the aforementioned first container position detector D1, the second container position detector D2 is also a detector that can determine whether the container is positioned by whether it is triggered or not. The second container position detector D2 can be, but not limited to, a device the same as or similar to the first container position detector. The first container position detector D2 can be, but not limited to, implemented by pressure, light or touch detecting, but the disclosure is not limited thereto. The second container position detector D2 is, for example, disposed in the second frame portion 10322e of the frame portion 1032e of the inner casing body 103e, and its trigger or switch (not numbered) is exposed and protrudes from the surface of the support casing body 107e facing the second container 20e. As such, when the second container 20e is correctly placed on the support casing body 107e, the second container 20e triggers the second container position detector D2. At this moment, the second container position detector D2 transmits position signal to the mainboard B1 via a wired or wireless manner so that the mainboard MB1 determines that the second container 20e is ready for the later processes. Note that when the mainboard MB1 did not receive the signal from the second container position detector D2, the mainboard MB1 may activate the sound or light emitting device on the user interface 1021e to warn the user, but the disclosure is not limited thereto.

Note that the disclosure is not limited to the type and design of the first container position detector D1 and the second container position detector D2; in some other embodiments, these position detectors can be a detector activated in a non-contact manner, such as an optical detector using laser or infrared ray.

In addition, similar to the previous embodiments, in this embodiment, the extraction device 1e also includes a sealing component 70e. The sealing component 70e is movably fixed on the casing 100e. More specifically, the sealing component 70e is movably fixed on the first frame portion 10321e of the inner casing body 103e of the casing 100e and located in the first frame portion 10321e. The sealing component 70e is configured to seal and cover the opening O of the first container 10e.

Similar to the previous embodiments, in this embodiment, the sealing component 70e includes a fluid discharge hole 71e and a suction hole 72e that are respectively connected to the aforementioned fluid channel 40e and the air suction channel 60e, where the second air tube 620e of the air suction channel 60e is connected to the suction hole 72e and the second connector T2 of the three-way joint T. Therefore, the fluid in the fluid channel 40e can be discharged from the fluid discharge hole 71e, and the air can be sucked into the air suction channel 60e via the suction hole 72e.

Similar to the previous embodiments, in this embodiment, the second container 20e contains a filter 22e to prevent the insoluble part of the solid content (e.g., the insoluble part of the ground coffee) from entering the fluid channel 40e from the discharge connector 21e. The filter 22e is in, for example, a plate shape and has a plurality of holes (not numbered) that allow fluid to flow through. In more detail, a hand-held structure 23e in rod shape is detachably fixed to the filter 22e: one end of the hand-held structure 23e is disposed through the filter 22e and screwed to a bottom plate 25e, such that the hand-held structure 23e, the filter 22e and the bottom plate 25e together form a T-shaped structure. The hand-held structure 23e extends toward the opening of the second container 20e from the filter 22e so that it is allowed to be held by hand so as to allow the user to take out the T-shaped structure from the second container 20e. As such, the coffee ground on the filter 22e can also be taken out from the second container 20e as well.

In addition, there are one or more of filter papers F1 located between and clamped by the filter 22e and the bottom plate 25e, and the filter papers F1 are configured to filter coffee ground. In addition, there is a filter film F2 disposed under the bottom plate 25e to filter coffee ground. However, the disclosure is not limited to the designs of the filter 22e, the hand-held structure 23e and the bottom plate 25e. In some other embodiments, the hand-held structure 23e, the filter paper F1, the filter film F2 and the bottom plate 25e all can be omitted.

Similar to the previous embodiments, in this embodiment, the extraction device 1e includes a stirring assembly 80e installed on the casing 100e. In detail, the stirring assembly 80e includes a stirring piece 810e, a transmission component 820e, a motor 830e, a transmission wheel 841e and a transmission wheel 842e. The motor 830e is installed in the first outer casing body 101e and located in the inner space S1. In this embodiment, the motor 830e is fixed on, for example, a stand 1022e which is fixed on the inner casing body 103e. The mainboard MB1 can be also fixed on the stand 1022e. The motor 830e is electrically connected to the mainboard MB1 so as to be controlled by the mainboard MB1.

The stirring piece 810e, the transmission component 820e, the transmission wheel 841e and the transmission wheel 842e all can be disposed on a cover 24e. The cover 24e is part of the appearance of the extraction device 1e, so the cover 24e can be considered as part of the casing 100e. Meanwhile, since the cover 24e is used to accommodate some components of the stirring assembly 80e, the cover 24e can also be considered as part of the stirring assembly 80e. More specifically, the transmission wheel 841e and the transmission wheel 842e are accommodated in the cover 24e and are rotatably located at two different places of the cover 24e. In addition, the bottom side of the cover 24e has two openings (not numbered) for the installation of the transmission wheel 841e and the transmission wheel 842e. The transmission component 820e can be, but not limited to, a transmission belt having inner teeth, and the transmission component 820e is located in the cover 24e and detachably sleeved on the transmission wheel 841e and the transmission wheel 842e so as to transmit power between the transmission wheel 841e and the transmission wheel 842e. The cover 24e is detachably disposed on the first outer casing body 101e and the second container 20e. When the cover 24e is disposed on the first outer casing body 101e and the second container 20e, the transmission wheel 841e corresponds to the motor 830e in the inner space S1 of the first outer casing body 101e so as to be connected with a drive shaft 8301e of the motor 830e. By doing so, the transmission wheel 841e can be rotated by being driven by the motor 830e. On the other hand, the transmission wheel 842e corresponds to the components located in the second container 20e.

In this embodiment, a rotational speed detector RD is provided to detect the rotational speed of the motor 830e, and the rotational speed detector RD can transmit a rotational speed signal to the mainboard MB1 based on the rotational speed. The rotational speed detector RD can be, but not limited to, an optical detector using laser or infrared ray, and it can measure the rotational speed of the motor 830e by measuring the drive shaft 8301e or the feature on the drive shaft 8301e.

The stirring piece 810e is in, for example, a plate shape and is detachably connected to the transmission wheel 842e. The stirring piece 810e is rotatable about an axis AX of the transmission wheel 842e. As such, when the motor 830e drives the transmission wheel 842e to rotate via the transmission wheel 841e and the transmission component 820e, the transmission wheel 842e drives the stirring piece 810e to rotate about the axis AX.

In addition, to ensure that the cover 24e is correctly positioned, in this embodiment, the extraction device 1e further includes a cover position detector D3 located in the inner space S1, the trigger or switch (not numbered) of the cover position detector D3 extends toward the cover 24e. When the cover 24e is placed on the desired position to trigger the cover position detector D3, the cover 24e is determined to be correctly positioned. This also means that the transmission wheel 841e is correctly connected to the motor 830e, and the stirring piece 810e is correctly placed in the second container 20e. At this moment, the cover position detector D3 transmits position signal to the mainboard MB1 via a wired or wireless manner so that the mainboard MB1 determines that the transmission wheel 841e is correctly connected to the motor 830e and the stirring piece 810e is correctly placed into the second container 20e. Note that the cover position detector D3 is also a detector that can determine whether the target object is positioned, and the cover position detector D3 can be, but not limited to, implemented by pressure, light or touch detecting, but the disclosure is not limited thereto.

Further, to automatically seal the opening O of the first container 10e, in this embodiment, the extraction device 1e further includes an elevating mechanism 90e configured to automatically switch the position of the sealing component 70e. In detail, referring to FIGS. 21A-21B and FIGS. 22A-22B, in this embodiment, the elevating mechanism 90e is installed in the first outer casing body 101e and located in the inner space S1, and the elevating mechanism 90e includes a driving member 910e, a driven member 920e, and a motor 930e. The motor 930e is fixed on, for example, a stand 1023e which is fixed on the inner casing body 103e and located in the first outer casing body 101e, and the motor 930e is electrically connected to the aforementioned mainboard MB1 so as to be controlled by the mainboard MB1. The driving member 910e is, for example, a gear fixed on the drive shaft (not numbered) of the motor 930e so as to be rotated by the motor 930e. The driven member 920e is, for example, a gear rack and protrudes from a side of the sealing component 70e facing the inner space S1. The driven member 920e is meshes with the driving member 910e. Therefore, when the motor 930e drives the driving member 910e to rotate, the driving member 910e drives the driven member 920e to move upward or downward, thereby moving the sealing component 70e upward or downward. As such, the sealing component 70e can be moved toward or away from the carrier base 104e so as to change the distance between the sealing component 70e and the first carrier base part 1041e of the carrier base 104e. That is, the sealing component 70e can be moved toward or away from the opening O of the first container 10e so as to seal or expose the opening O of the first container 10e.

Figure 22A:
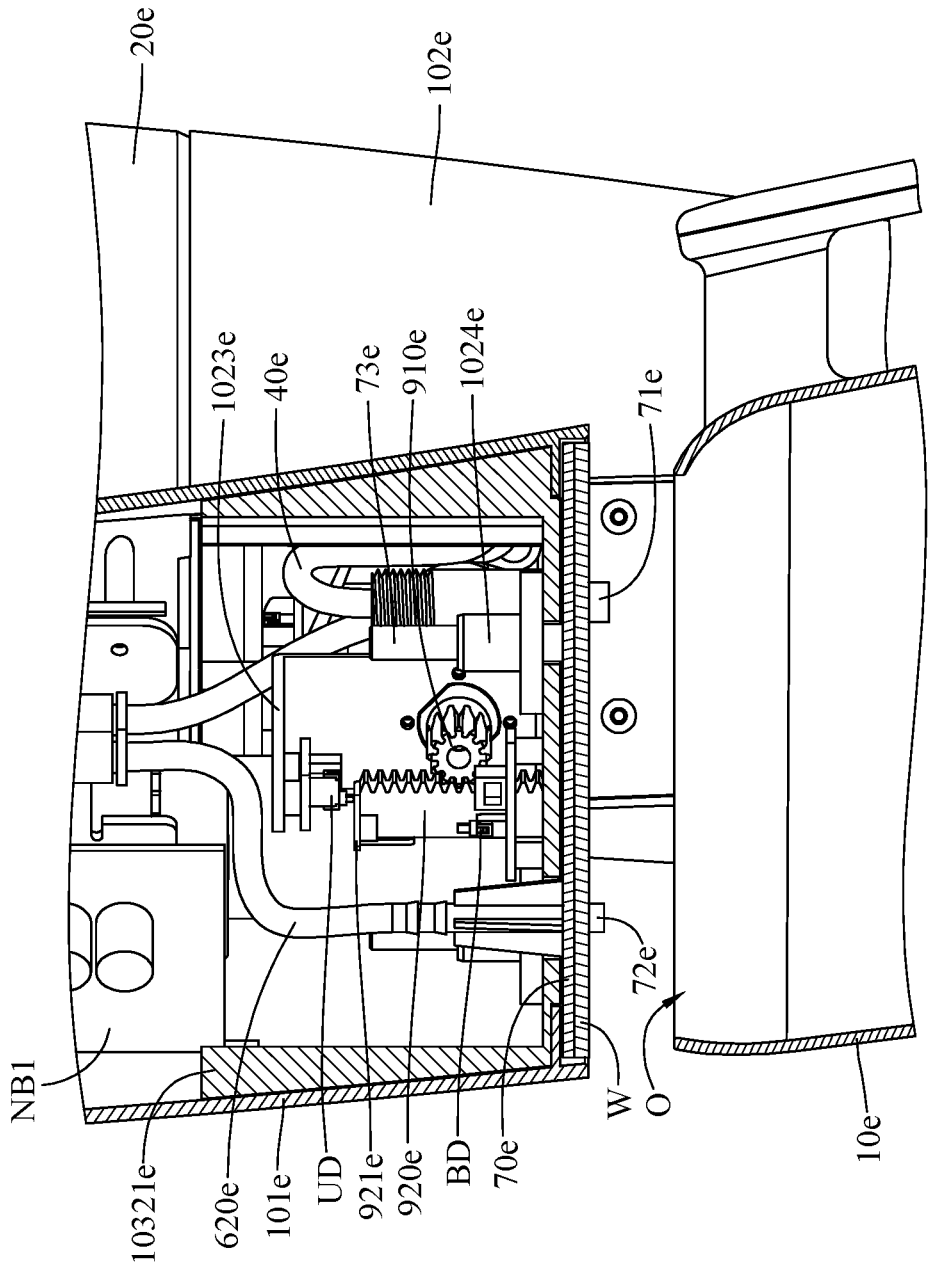
FIGS. 22A-22B show partial enlarged cross-sectional side views of the extraction device in FIG. 18 when the sealing component is switching positions.
Figure 22B:
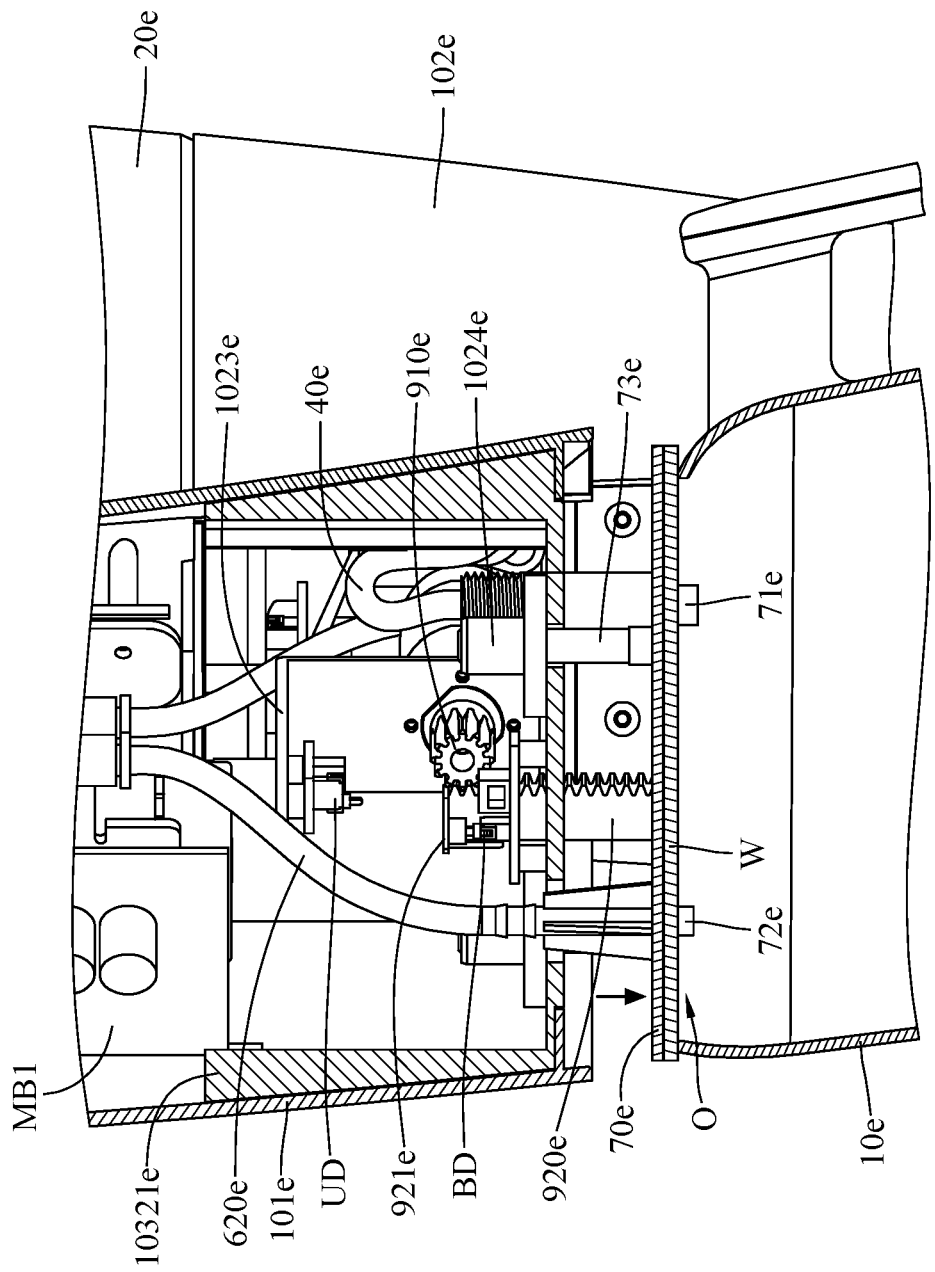

Referring to FIGS. 22B, the sealing component 70e can be moved downward to a lower position to cover and seal the opening O of the first container 10e by being driven by the elevating mechanism 90e. The purpose of the sealing component 70e is the same as that of the previous embodiments. In addition, to increase the airtightness, there may be a layer of silicone or rubber W provided on a sider of the sealing component 70e facing the first container 10e. On the other hand, referring to FIG. 22A, the sealing component 70e can be moved upward to an upper position to be moved away from the opening O of the first container 10e by being driven by the elevating mechanism 90e. When the sealing component 70e is moved to the upper position from the lower position, the sealing component 70e exposes the opening O of the first container 10e.

Note that the travel distance of the sealing component 70e between the upper position and the lower position can be changed by the actual requirements, such as the size of the first container 10e or the required level of airtightness, and the disclosure is not limited thereto.

In addition, there is at least one guide pillar 73e protruding from the side of the sealing component 70e facing the inner space S1. The guide pillar 73e is movably disposed through at least one guide ring 1024e fixed on the frame portion 1032e. The guide ring 1024e is able to guide the upward and downward movements of the sealing component 70e, but the disclosure is not limited to the guide pillar 73e, the guide ring 1024e and their quantities.

Further, to determine whether the sealing component 70e reaches the highest or lowest position, the extraction device 1e further includes a lower dead point detector BD and an upper dead point detector UD that are located in the frame portion 1032e. In detail, in this embodiment, the lower dead point detector BD and the upper dead point detector UD are also a detector that can determine whether the target object is positioned by whether it is triggered or not and can be, but not limited to, implemented by pressure, light or touch detecting. The lower dead point detector BD and the upper dead point detector UD can be, but not limited to, the same or different types of detector, and the disclosure is not limited thereto. There is an arm 921e extending from the top end of the driven member 920e. The lower dead point detector BD is disposed right under the arm 921e and its trigger or switch (not numbered) extending toward the arm 921e. The upper dead point detector UD is disposed on the side of the aforementioned stand 1023e facing the sealing component 70e and its trigger or switch (not numbered) extending toward the driven member 920e.

While the sealing component 70e is being moved toward the lower position, the arm 921e on the driven member 920e moves toward the lower dead point detector BD and eventually touches and activates the lower dead point detector BD. At this moment, the lower dead point detector BD transmits signal to the mainboard B1 via a wired or wireless manner so that the mainboard MB1 determines that the sealing component 70e reaches the lower position, and then the mainboard MB1 transmits signal to stop the elevating mechanism 90e so as to stop the downward movement of the sealing component 70e.

On the other hand, when the sealing component 70e is being moved toward the upper position, the driven member 920e moves toward the upper dead point detector UD and eventually touches and activates the upper dead point detector UD. At this moment, transmits signal to the mainboard B1 via a wired or wireless manner so that the mainboard MB1 determines that the sealing component 70e reaches the upper position, and then the mainboard MB1 transmits signal to stop the elevating mechanism 90e so as to stop the upward movement of the sealing component 70e.

Similarly, note that the disclosure is not limited to the type and design of the lower dead point detector BD and the upper dead point detector UD; in some other embodiments, these detectors can be a detector activated in a non-contact manner, such as an optical detector using laser or infrared ray.

As the embodiment discussed above, the extraction device 1e provides some features that facilitate the preparation process before the extraction process: the cooperation of the first guide structure 104e1 of the carrier base 104e and the second guide structure 11e of the first container 10e can help to guide the first container 10e to be positioned to the ready position; the mainboard MB1 is able to ensure that the first container 10e is correctly positioned when the first container position detector D1 is activated by the first container 10e; when the user activates the respective button on the user interface 1021e or after the mainboard MB1 receives the signal from the first container position detector D1, the elevating mechanism 90e can automatically move the sealing component 70e to seal the opening O of the first container 10e (i.e., the step S03 in FIG. 7), in step S03, the elevating mechanism 90e moves the sealing component 70e to seal the opening O of the first container 10e; and the mainboard MB1 can automatically stop the operation of the elevating mechanism 90e to stop the downward movement of the sealing component 70e when the sealing component 70e reaches and activates the lower dead point detector BD. In addition, when the second container 20e is correctly connected to the valve 30e, the second container 20e can correctly activate the second container position detector D2 so as to let the mainboard MB1 to ensure that the second container 20e is correctly positioned and connected to the valve 30e. Note that the mainboard MB1 can activate the elevating mechanism 90e after it receives the signals from both the first container position detector D1 and the second container position detector D2, but the disclosure is not limited thereto.

After the second container 20e has been installed, the cover 24e can be installed on the first outer casing body 101e and the second container 20e to let the transmission wheel 841e to connected to the motor 830e and to place the stirring piece 810e into the opening of the second container 20e, thereby completing the installation of the stirring assembly 80e. When the cover 24e is correctly installed, the cover 24e can activate the cover position detector D3 to let the mainboard MB1 to ensure that the transmission wheel 841e and the stirring piece 810e are correctly installed. Note that the mainboard MB1 can activate the elevating mechanism 90e after it receives the signals from all of the first container position detector D1, the second container position detector D2, the lower dead point detector BD, and the cover position detector D3, but the disclosure is not limited thereto. In addition, when the cover 24e is correctly installed, one end of the hand-held structure 23e can slightly contact or have a neglectable gap relative to the joint in which the stirring piece 810e is connected to the transmission wheel 842e.

As such, whether the first container 10e and the second container 20e are correctly installed or the first container 10e is properly sealed all can be automatically determined by the extraction device 1e. This is convenient and has a low error rate.

After the preparation processes are completed, the user can then operate the user interface 1021e to activate the extraction process of the extraction device 1e; alternatively, the mainboard MB1 can automatically activate the air suction device 50e to begin the extraction process after activating the stirring piece 810e for a predetermined period of time. As discussed above, during the operation of the air suction device 50e, the pressure detector P1 is able to continuously detect the internal pressure of the first container 10e and transmit corresponding signal to the mainboard MB1. Herein, referring to step S07 in FIG. 7, the step S07 is to use the pressure detector P1 to continuously detect the internal pressure of the first container 10e. As such, the mainboard MB1 can determine whether to turn off the air suction device 50e or to adjust the power of the air suction device 50e and thus automatically adjust the decreasing rate of the internal pressure of the first container 10e. As such, the internal pressure of the first container 10e can be automatically precisely adjusted to the predetermined value. When the mainboard MB1 determines that the internal pressure of the first container 10e reaches the predetermined value of the current extraction, the mainboard MB1 can automatically open the valve 30e to let the fluid in the second container 20e to flow to the first container 10e. Accordingly, the extraction device 1e achieves an automated extraction process.

Moreover, referring back to FIG. 19A, in this embodiment, the extraction device 1e further includes an antenna AT, the antenna AT is disposed in, for example, the carrier base 104e and can communicate with the mainboard MB1 via a wired or wireless manner. The antenna AT is able to receive external information or signal and transmit it to the mainboard MB1. For example, the antenna AT is able to receive the instruction from smartphone or other types of smart electronic devices, the instruction may include the stirring time, the type of coffee, the extraction time or any other information that can be determined by the user during the extraction process. Moreover, the instruction may also include the selection of coffee flavor from the menu stored in the extraction device 1e. As such, the user can operate the extraction device 1e by sending instruction to the antenna AT. On the other hand, the extraction device 1e is also able to interact with the user through the antenna AT, such as sending the setting or extraction result of the current operation to the user's smartphone or to the cloud for later use, but the disclosure is not limited thereto.

According to the extraction device and the extracting method discussed above, the valve will be opened when the internal pressure of the first container is decreased to a predetermined value by the air suction device. Therefore, as the valve is opened, the first container and the second container can have a sufficient pressure difference to extract the soluble substances (e.g., the flavor components of the coffee) from the raw materials (e.g., the ground coffee) and make the soluble substances and the liquid flow into the first container in a short period of time. Based on the experiment result, such pressure-decreasing extraction process can dramatically shorten the time for extracting the flavor components.

For example, as the extraction device is applied to brew coffee, the pressure-decreasing extraction process can create a sufficient pressure difference to extract the soluble flavors from the ground coffee in a short period of time, and the whole processes including stirring, wetting, and extracting can only take approximately 5 minutes.

In contrast to the prior art that needs to take hours to extract the soluble flavors, the extraction time required by the extraction device of the disclosure is dramatically reduced to merely a few minutes. Therefore, the extraction device of the disclosure can instantly offer the cold brew coffee and has no need to pre-prepare a large amount of it, which helps to save the space in the refrigerator and to reduce the electricity consumption. In addition, to make the brew coffee by the extraction device of the disclosure, the ground coffee is only soaked in the water in a relatively short period of time, so it can greatly reduce the impurities, that affect the flavor, from being dissolved in the water.

Regarding various requirements for different coffee flavors and coffee beans, the extraction device of the disclosure can record one or more extraction templates of a different group of operation information for performing the stirring, wetting and extraction processes so as to extract a specific flavor from a particular coffee bean. It is understood that opening the template is more efficient than re-creating the operation settings. In addition, in order to produce whether a concentrated beverage or a ready-to-drink beverage having a specific flavor profile, all the settings of the extraction device of the disclosure with respect to the stirring, wetting and extraction processes are adjustable.

In addition, the extraction devices in some embodiments have a sealing component that can seal the first container to improve the pressure-decreasing extraction process. And some of the extraction devices of the disclosure at least have a positioning and/or guiding mechanism for the user to efficiently and correctly install the first container to the desired position.

Further, in some of the embodiments, the extraction devices may also be used to produce cold brew tea or even hot brew coffee or hot brew tea. It is understood that higher temperature water is easier to dissolve the soluble components. Therefore, hot brew coffee may require a different extraction rate, for example, a TDS between 1.15 and 1.3, and the operation settings with respect to the ratio and the stirring, wetting, and extraction processes will be adjusted accordingly.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An extraction device, configured for a mixture comprising a liquid and a raw material, the extraction device comprising:
   a first container;
   a second container, configured for storing the mixture;
   a valve, connected to the second container and the first container;
   an air suction device, connected to the first container and configured to decrease an internal pressure of the first container to a predetermined value; and
   a sealing component configured to detachably cover an opening of the first container, wherein the sealing component has a fluid discharge hole and a suction hole;
   wherein when the internal pressure of the first container reaches the predetermined value, the valve is activated to connect the first container to the second container.

2. The extraction device according to claim 1, further comprising a fluid channel connected to the second container and the first container, wherein the valve is disposed on the fluid channel.

3. The extraction device according to claim 2, the fluid discharge hole is connected to the fluid channel, and the suction hole is connected to the air suction device.

4. The extraction device according to claim 3, further comprising a casing and a position detector, wherein the position detector is disposed on the casing, the first container is detachably disposed on the casing, when the first container is fixed on the casing, the first container or the sealing component activates the position detector.

5. The extraction device according to claim 3, further comprising a casing, the casing comprising a push button, wherein the sealing component is movably fixed on the casing so as to have a lower position and an upper position; when the sealing component is in the lower position, the sealing component covers the opening of the first container; when the sealing component is in the upper position, the sealing component is located relative away from the opening of the first container, and the push button is configured to move the sealing component between the lower position and the upper position.

6. The extraction device according to claim 3, further comprising a casing, the casing having at least one first positioning structure, and the sealing component having at least one second positioning structure detachably disposed on the at least one first positioning structure of the casing.

7. The extraction device according to claim 1, further comprising an air suction channel connected to the first container and the air suction device.

8. The extraction device according to claim 1, further comprising a casing, the casing having a first guide structure, the first container having a second guide structure, wherein the second guide structure is detachably disposed on the first guide structure of the casing.

9. The extraction device according to claim 1, further comprising a stirring assembly, the stirring assembly comprising a stirring piece and a transmission component, wherein the transmission component is assembled to the second container, the stirring piece is connected to the transmission component, the stirring piece is movable in the second container and is configured to stir the raw material and the liquid.

10. The extraction device according to claim 9, wherein the stirring assembly further comprises a motor, the transmission component is connected to the stirring piece and the motor, and the motor is configured to drive the stirring piece via the transmission component.

11. The extraction device according to claim 10, further comprising a casing, a mainboard, a cover and a cover position detector, wherein the first container is removably disposed on the casing, the cover is detachably disposed on the casing, the cover position detector and the mainboard are both disposed on the casing, the stirring piece is connected to the cover; when the cover is disposed on the casing so as to connect the stirring piece to the motor and to place the stirring piece into the second container, the cover activates the cover position detector, and the cover position detector transmits a position signal to the mainboard.

12. The extraction device according to claim 11, further comprising a rotational speed detector disposed on the casing and configured to measure a rotational speed of the motor.

13. The extraction device according to claim 1, further comprising a liquid suction channel connected to the first container and configured to connect the first container to the outside.

14. The extraction device according to claim 1, further comprising a filter and a hand-held structure, wherein the filter is disposed in the second container and configured to prevent the raw material from entering the first container, the hand-held structure is detachably fixed to the filter and extends toward an opening of the second container from the filter.

15. The extraction device according to claim 1, further comprising a casing, an elevating mechanism, wherein the elevating mechanism is disposed on the casing, and the sealing component is connected to the elevating mechanism, and the elevating mechanism is configured to move the sealing component to cover and seal the opening of the first container.

16. The extraction device according to claim 15, further comprising a guide ring, wherein the guide ring is disposed in the casing, the sealing component has a guide pillar, and the guide pillar is movably disposed through the guide ring.

17. The extraction device according to claim 15, wherein the elevating mechanism comprises a driving member, a driven member and a motor, the motor is disposed on the casing, the driving member is movable by the motor, the driven member is a gear and is fixed on the sealing component, and the driven member is a gear rack and is movable by the driving member.

18. The extraction device according to claim 15, further comprising a first container position detector, wherein the first container position detector is disposed on the casing, when the first container activates the first container position detector, the elevating mechanism moves the sealing component to cover and seal the opening of the first container.

19. The extraction device according to claim 18, further comprising a mainboard, the mainboard is disposed on the casing; when the first container activates the first container position detector, the first container position detector transmits a position signal to the mainboard to activate the air suction device.

20. The extraction device according to claim 19, further comprising a mainboard and an antenna, wherein the first container position detector is electrically connected to the mainboard, and the antenna is communicably connected to the mainboard.

21. The extraction device according to claim 15, further comprising a mainboard and a second container position detector, wherein the mainboard and the second container position detector are disposed on the casing; when the second container is disposed on the casing and connected to the valve, the second container activates the second container position detector, and the second container position detector transmits a position signal to the mainboard.

22. The extraction device according to claim 15, further comprising a mainboard and a lower dead point detector, wherein the lower dead point detector and the mainboard are disposed on the casing; when the sealing component is moved to seal the opening of the first container by being driven by the elevating mechanism, the elevating mechanism activates the lower dead point detector, and the mainboard stops the operation of the elevating mechanism.

23. The extraction device according to claim 15, further comprising a mainboard and an upper dead point detector, wherein the upper dead point detector and the mainboard are disposed on the casing; when the sealing component is moved away from the opening of the first container by being driven by the elevating mechanism, the elevating mechanism activates the upper dead point detector, and the mainboard stops the operation of the elevating mechanism.

24. The extraction device according to claim 1, further comprising a casing, a mainboard and a pressure detector, wherein the mainboard is disposed in the casing, the pressure detector is disposed on the mainboard, and the pressure detector is configured to detect the internal pressure of the first container.

25. The extraction device according to claim 24, further comprising a first connector, a second connector, a third connector, a first air tube, a second air tube, and a third air tube, wherein the sealing component to is configured to cover and seal the opening of the first container, the first air tube is connected to the air suction device and the first connector, the second air tube is connected to the suction hole of the sealing component and the second connector, and the third air tube is connected to the third connector and the pressure detector.

26. The extraction device according to claim 24, further comprising a mainboard and an antenna, the air suction device and the pressure detector are electrically connected to the mainboard, and the antenna is communicably connected to the mainboard.

27. An extracting method, comprising:
providing the extraction device according to claim 1;
performing a pressure-decreasing process on the first container;
determining whether an internal pressure of the first container is smaller than or equal to a predetermined value;
when the internal pressure of the first container is determined to be smaller than or equal to the predetermined value, the valve is activated; and
when the internal pressure of the first container is determined to be larger than the predetermined value of pressure, performing the pressure-decreasing process on the first container.

28. The extracting method according to claim 27, wherein the extraction device further comprises a second container, the valve is connected to the second container and configured to be connected to the first container, the second container is configured to store a mixture comprising a liquid and a raw material, the extracting method, before performing the pressure-decreasing process on the first container, comprises:
performing a stirring process to move a stirring piece in the second container so as to stir the mixture in the second container.

29. The extracting method according to claim 28, before performing the stirring process, further comprising:
    detecting the mixture of the second container.

30. The extracting method according to claim 27, before performing the pressure-decreasing process on the first container, further comprising:
    moving the sealing component to cover and seal the opening of the first container.

31. The extracting method according to claim 27, after the valve is activated, further comprising:
    using a pressure detector to continuously detecting the internal pressure of the first container.

32. An extraction device, configured for a mixture comprising a liquid and a raw material and for a first container having an opening, the extraction device comprising:
    a second container, configured for storing the mixture;
    a valve, connected to the second container and the first container; and
    an air suction device, configured to decrease an internal pressure of the first container to a predetermined value; and
    a sealing component configured to detachably cover the opening of the first container, wherein the sealing component has a fluid discharge hole and a suction hole;
    wherein when the internal pressure of the first container reaches the predetermined value, the valve is activated to connect the second container to the first container.

33. The extraction device according to claim 32, further comprising a position detector and an elevating mechanism, wherein the sealing component is moveable by the elevating mechanism and configured to seal the opening of the first container; when the position detector is activated by the first container, the elevating mechanism moves the sealing component to cover and seal the opening of the first container.

34. The extraction device according to claim 32, further comprising a pressure detector, wherein the pressure detector is configured to detect an internal pressure of the first container.

* * * * *